(12) United States Patent
Zhou et al.

(10) Patent No.: US 11,877,354 B2
(45) Date of Patent: Jan. 16, 2024

(54) ASSISTANCE INFORMATION FOR FULL-DUPLEX RELAY USER EQUIPMENT SELECTION

(71) Applicant: QUALCOMM Incorporated, San Diego, CA (US)

(72) Inventors: Yan Zhou, San Diego, CA (US); Qian Zhang, Basking Ridge, NJ (US); Sony Akkarakaran, Poway, CA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 17/305,489

(22) Filed: Jul. 8, 2021

(65) Prior Publication Data
US 2023/0010134 A1    Jan. 12, 2023

(51) Int. Cl.
| | |
|---|---|
| *H04W 88/04* | (2009.01) |
| *H04B 17/336* | (2015.01) |
| *H04W 8/24* | (2009.01) |
| *H04W 24/10* | (2009.01) |
| *H04L 5/14* | (2006.01) |

(52) U.S. Cl.
CPC .......... *H04W 88/04* (2013.01); *H04B 17/336* (2015.01); *H04L 5/14* (2013.01); *H04W 8/24* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2011/0038283 A1* | 2/2011 | Yu | ....................... | H04B 7/15557 370/277 |
| 2014/0301370 A1* | 10/2014 | Sivavakeesar | ........... | H04B 7/15 370/331 |
| 2015/0372801 A1* | 12/2015 | Smee | .................... | H04W 72/51 370/296 |

(Continued)

FOREIGN PATENT DOCUMENTS

| | | | |
|---|---|---|---|
| WO | 2021004627 A1 | | 1/2021 |
| WO | WO-2021004627 A1 | * | 1/2021 |
| WO | 2021236580 | | 11/2021 |

OTHER PUBLICATIONS

International Search Report and Written Opinion—PCT/US2022/073340—ISA/EPO—dated Oct. 17, 2022.

*Primary Examiner* — Ajit Patel
*Assistant Examiner* — Liem H. Nguyen
(74) *Attorney, Agent, or Firm* — QUALCOMM Incorporated

(57) ABSTRACT

Various aspects of the present disclosure generally relate to wireless communication. In some aspects, a relay user equipment (UE) may transmit full-duplex (FD) information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams. The UE may communicate based at least in part on the FD information. Numerous other aspects are described.

27 Claims, 16 Drawing Sheets

(56) References Cited

U.S. PATENT DOCUMENTS

| | | | | |
|---|---|---|---|---|
| 2016/0100415 | A1* | 4/2016 | Mishra | H04L 5/14 |
| | | | | 370/277 |
| 2017/0331577 | A1* | 11/2017 | Parkvall | H04W 4/00 |
| 2017/0347338 | A1* | 11/2017 | Chen | H04W 4/00 |
| 2018/0152921 | A1* | 5/2018 | Jung | H04W 72/04 |
| 2019/0123806 | A1* | 4/2019 | Aryafar | H04L 5/14 |
| 2019/0230723 | A1* | 7/2019 | Kim | H04W 76/10 |
| 2019/0387429 | A1* | 12/2019 | Basu Mallick | H04W 40/24 |
| 2020/0052775 | A1* | 2/2020 | Nam | H04B 17/336 |
| 2020/0100088 | A1* | 3/2020 | Kim | H04W 48/16 |
| 2020/0127803 | A1* | 4/2020 | Luo | H04B 7/0854 |
| 2020/0322486 | A1* | 10/2020 | Friedrich | H04M 15/93 |
| 2021/0075497 | A1* | 3/2021 | Tekgul | H04W 8/22 |
| 2021/0152418 | A1* | 5/2021 | Abdelghaffar | H04L 41/0803 |

* cited by examiner

ASSISTANCE INFORMATION FOR FULL-DUPLEX RELAY USER EQUIPMENT SELECTION

FIELD OF THE DISCLOSURE

Aspects of the present disclosure generally relate to wireless communication and to techniques and apparatuses for assistance information for full-duplex (FD) relay user equipment (UE) selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a relay user equipment (UE) includes transmitting full-duplex (FD) information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and communicating based at least in part on the FD information.

In some aspects, a method of wireless communication performed by a destination UE includes receiving FD information associated with a relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and communicating based at least in part on the FD information.

In some aspects, a method of wireless communication performed by an apparatus of a network entity includes receiving, from a relay UE, FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and transmitting the FD information to a destination UE associated with the relay UE.

In some aspects, an apparatus of a relay UE for wireless communication includes a memory; and one or more processors, coupled to the memory, configured to: transmit FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and communicate based at least in part on the FD information.

In some aspects, an apparatus of a destination UE for wireless communication includes a memory; and one or more processors, coupled to the memory, configured to: receive FD information associated with a relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and communicate based at least in part on the FD information.

In some aspects, an apparatus of a network entity for wireless communication includes a memory; and one or more processors, coupled to the memory, configured to: receive, from a relay UE, FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and transmit the FD information to a destination UE associated with the relay UE.

In some aspects, a non-transitory computer-readable medium storing a set of instructions for wireless communication includes one or more instructions that, when executed by one or more processors of a relay UE, cause the UE to: transmit FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and communicate based at least in part on the FD information.

In some aspects, a non-transitory computer-readable medium storing a set of instructions for wireless communication includes one or more instructions that, when executed by one or more processors of a destination UE, cause the UE to: receive FD information associated with a relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and communicate based at least in part on the FD information.

In some aspects, a non-transitory computer-readable medium storing a set of instructions for wireless communication includes one or more instructions that, when executed by one or more processors of a network entity, cause the network entity to: receive, from a relay UE, FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and transmit the FD information to a destination UE associated with the relay UE.

In some aspects, an apparatus of a relay UE for wireless communication includes means for transmitting FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and means for communicating based at least in part on the FD information.

In some aspects, an apparatus of a destination UE for wireless communication includes means for receiving FD information associated with a relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and means for communicating based at least in part on the FD information.

In some aspects, an apparatus of a network entity for wireless communication includes means for receiving, from a relay UE, FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and means for transmitting the FD information to a destination UE associated with the relay UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
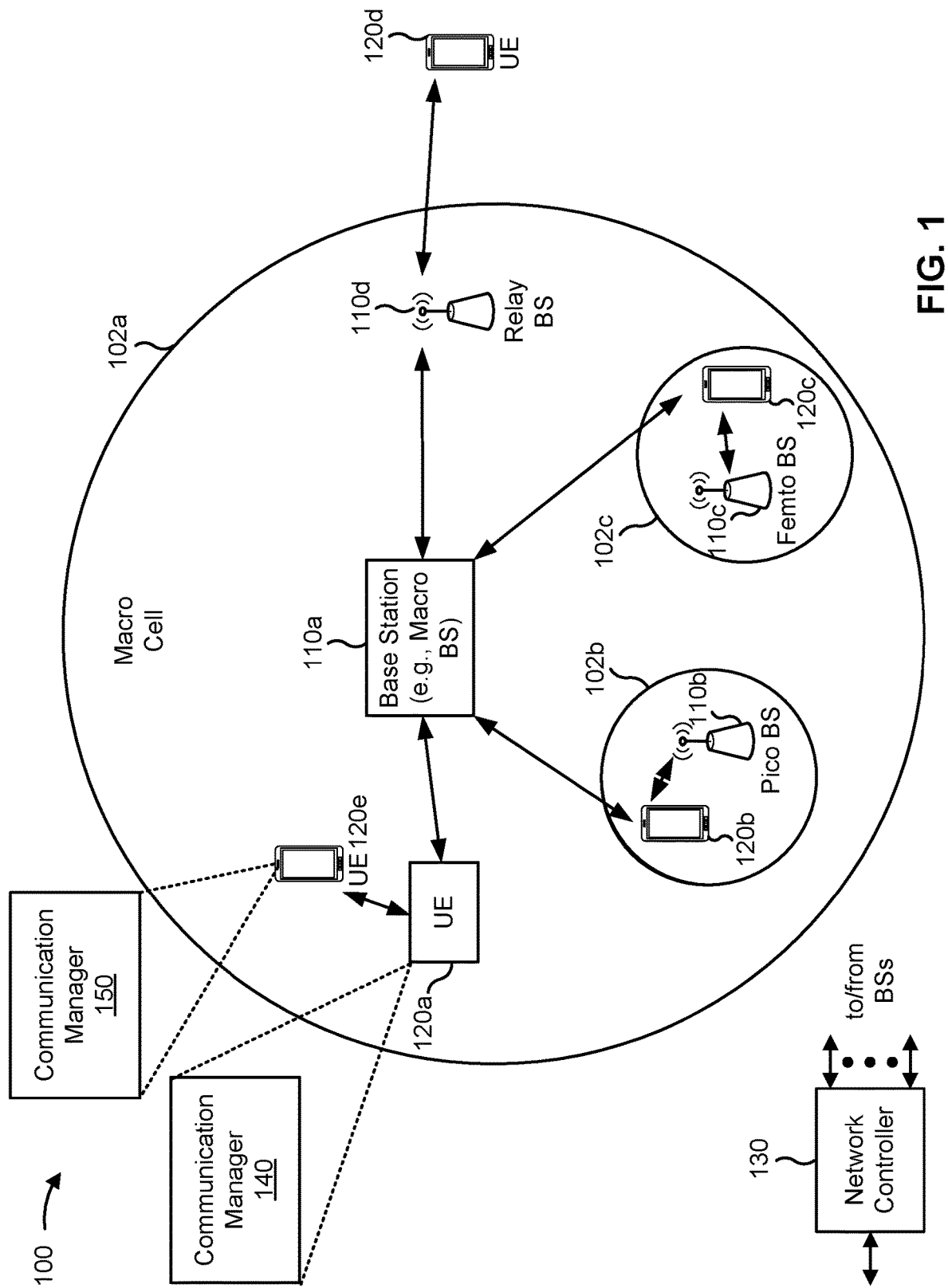
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with assistance information for full-duplex (FD) relay UE selection. Additionally, or alternatively, the communication manager 140 may perform one or more other operations described herein.

In some aspects, the base station 110 may include a communication manager 150. As described in more detail elsewhere herein, the communication manager 150 may perform one or more operations associated with assistance information for FD relay UE selection. Additionally, or alternatively, the communication manager 150 may perform one or more other operations described herein.

As indicated above, FIG. 1 is provided as an example. Other examples may differ from what is described with regard to FIG. 1.

Figure 2:
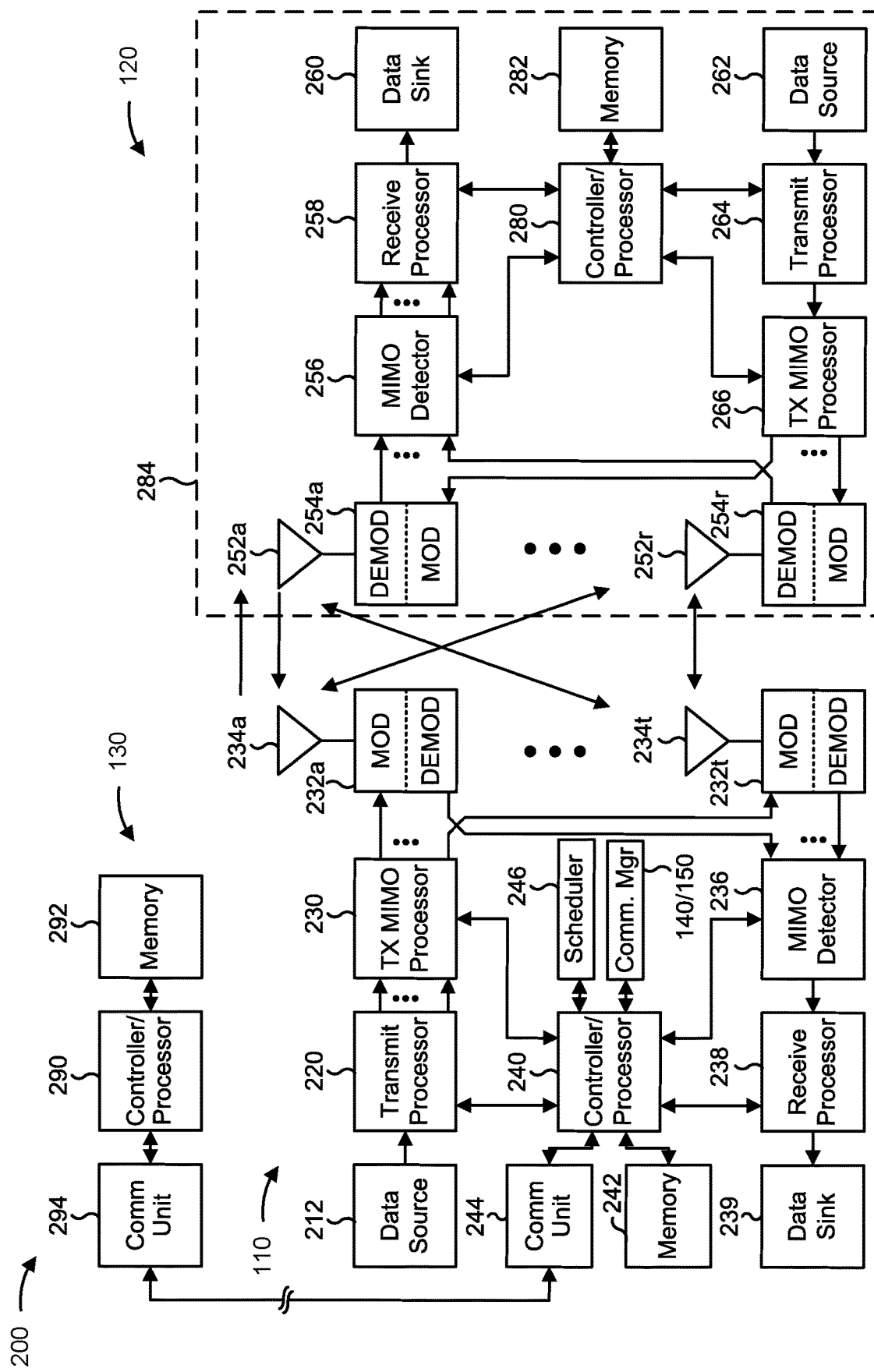
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-16).

The controller/processor 240 of the base station 110, the controller/processor 280 of the UE 120, and/or any other component(s) of FIG. 2 may perform one or more techniques associated with assistance information for FD UE selection, as described in more detail elsewhere herein. In some aspects, the network entity described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, UE 120 may include means for transmitting FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams, means for communicating based at least in part on the FD information, or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

In some aspects, base station 110 may include means for receiving FD information associated with a relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams, means for communicating based at least in part on the FD information, or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

In some aspects, a network entity (e.g., base station 110, a third-party server, a third-party controller, or the like) may include means for receiving, from a relay UE, FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams, means for transmitting the FD information to a destination UE associated with the relay UE, or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
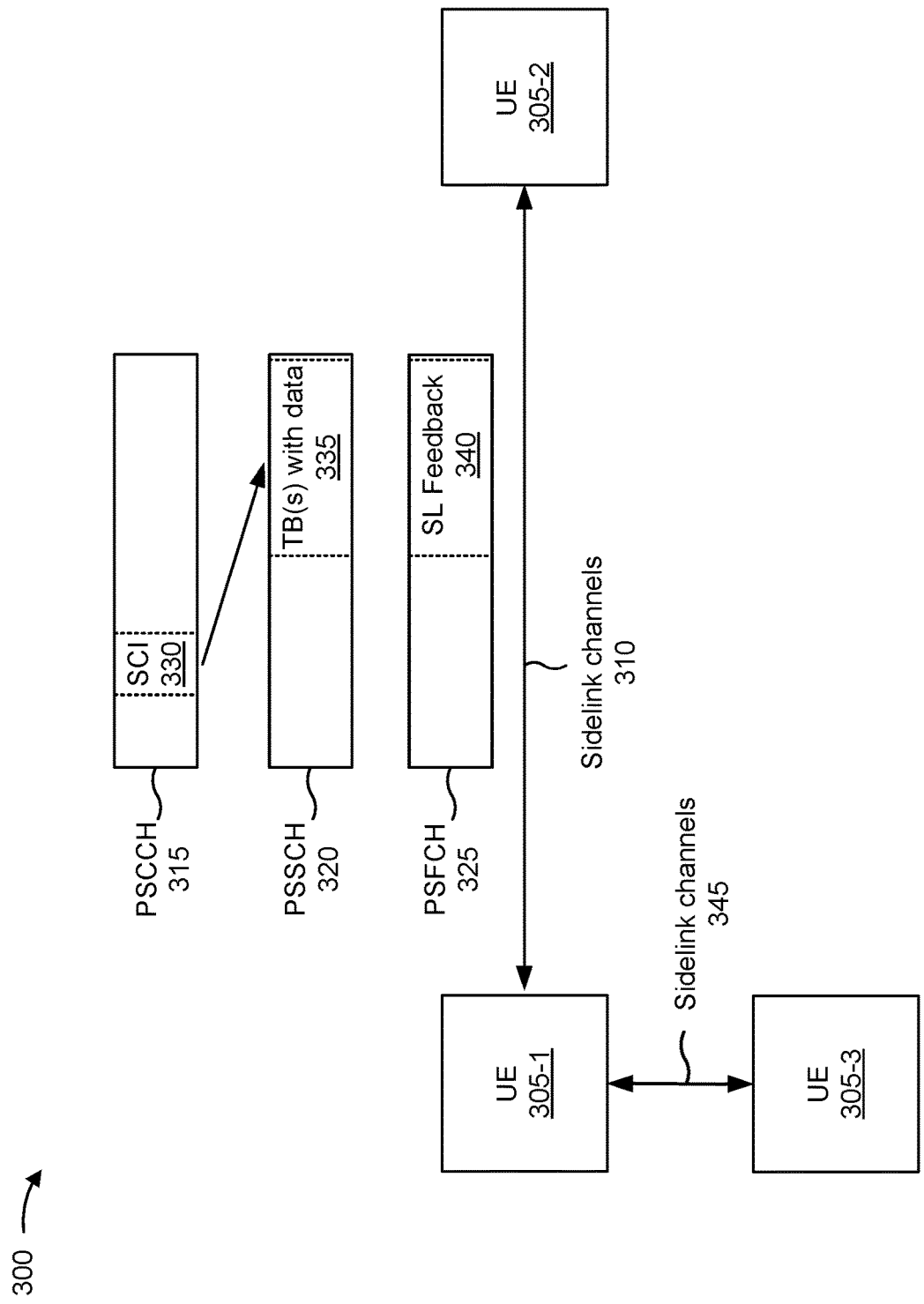
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or a MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent resource blocks (RBs) in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some cases, a UE may utilize a sidelink to relay communications from one UE to another UE. As shown in FIG. 3, the UE 305-1 may communicate with UE 305-3 via sidelink channels 345. In some cases, the UE 305-1 may utilize the sidelink channels 345 to receive communications from the UE 305-3 and may utilize sidelink channels 310 to relay the received communications to the UE 305-2. As also shown in FIG. 3, the UE 305-1 may utilize the sidelink channels 310 to receive communications for the UE 305-3 from the UE 305-2 and may utilize the sidelink channels 345 to transmit the received communications to the UE 305-3.

As indicated above, FIG. 3 is provided as an example. Other examples may differ from what is described with respect to FIG. 3.

Figure 4:
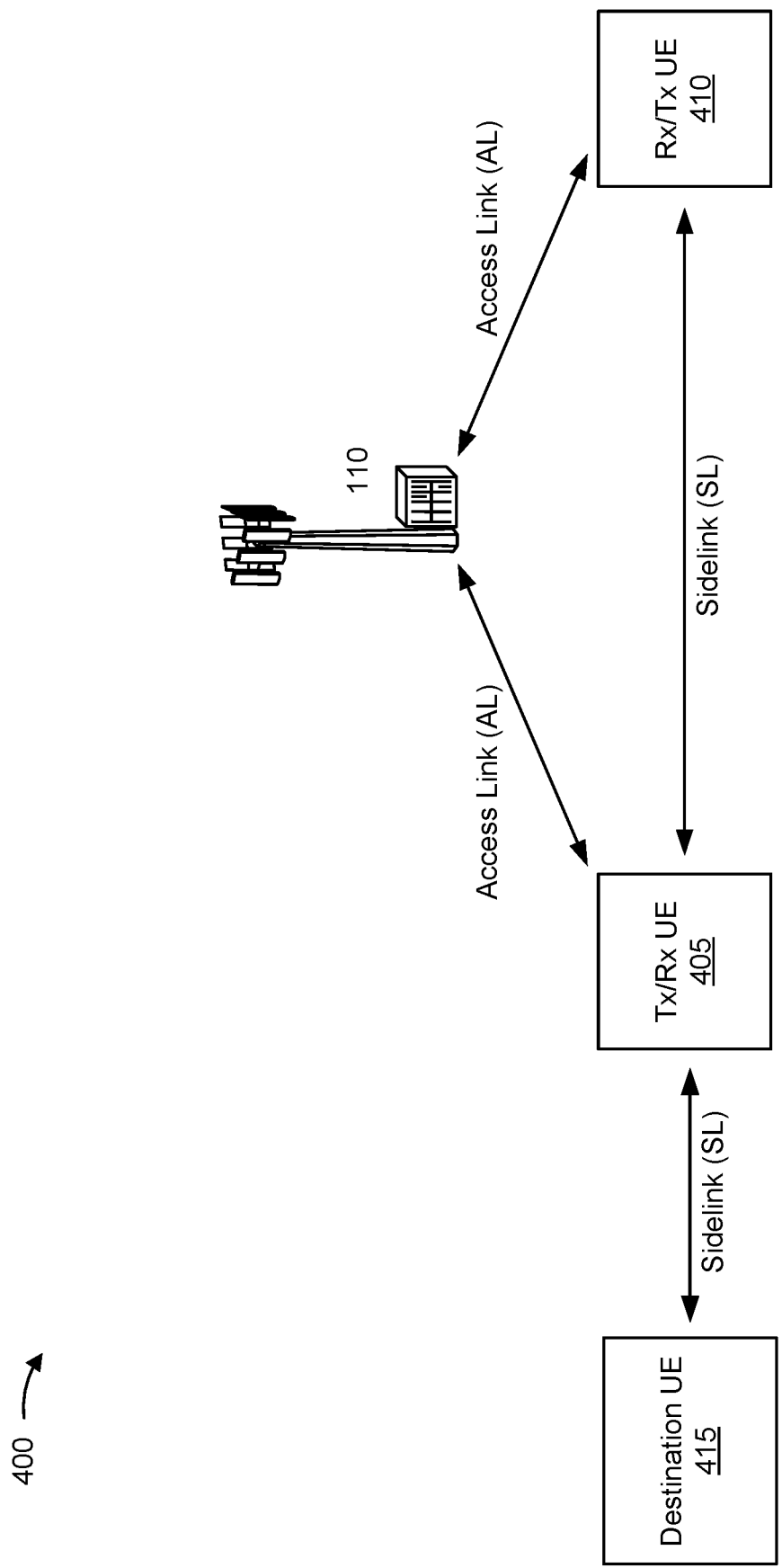
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some cases, a UE 120 may utilize a sidelink to relay communications from and/or to another UE and may utilize an access link to relay communications associated with the other UE from and/or to the base station 110. For example, as shown in FIG. 4, the UE 405 may utilize a sidelink to receive communications from the UE 415 and may utilize an access link to relay the received communications to the base station 110. As also shown in FIG. 4, the UE 405 may utilize the access link to receive communications for the UE 415 from the base station 110 and may utilize the sidelink to transmit the received communications to the UE 415. A UE 415 that communicates with another UE or a base station 110 via a relaying UE 405 is referred to herein as a destination UE.

As indicated above, FIG. 4 is provided as an example. Other examples may differ from what is described with respect to FIG. 4.

Figure 5:
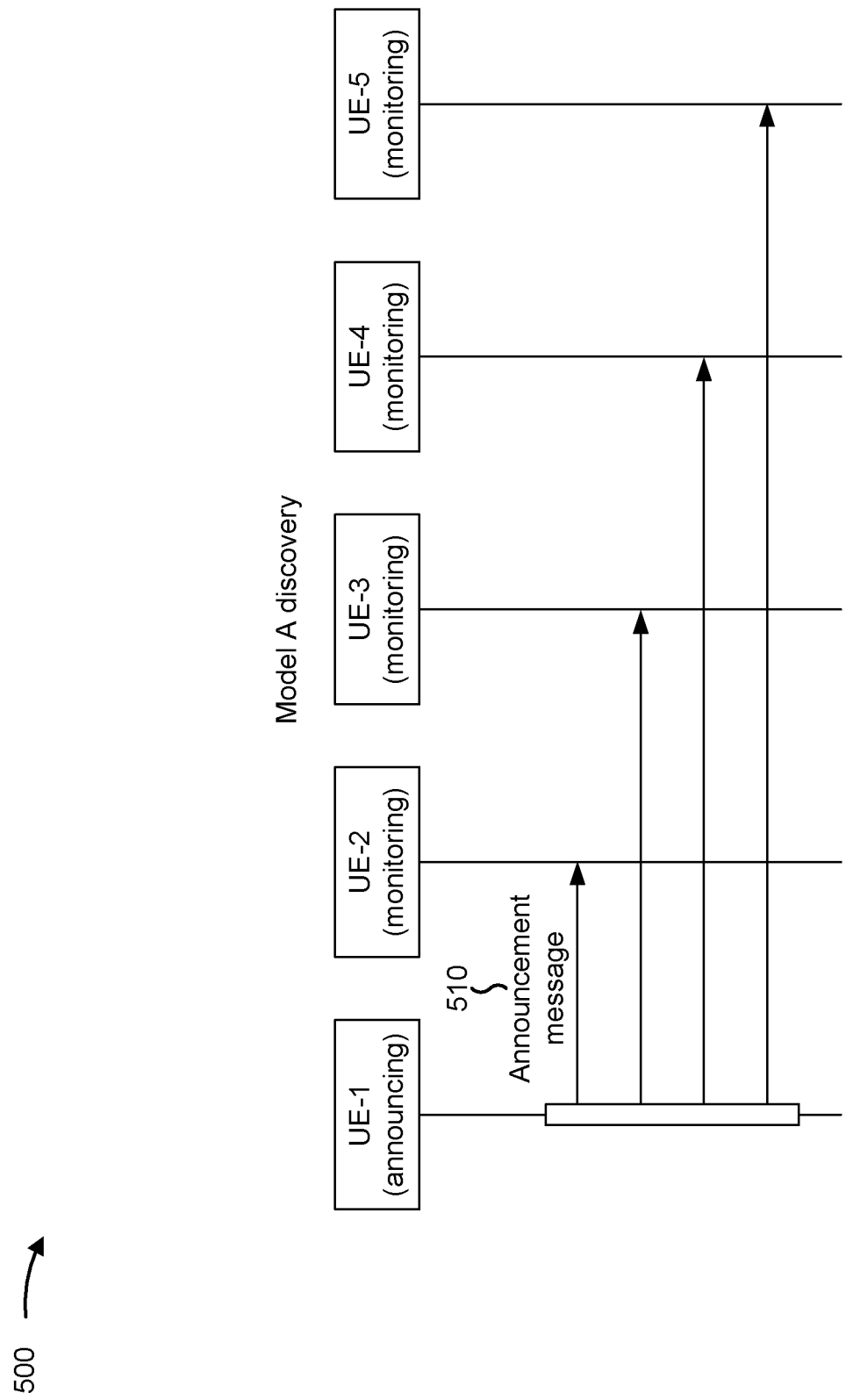
FIG. 5 is a diagram illustrating an example of a first discovery model for UEs performing sidelink communications, in accordance with the present disclosure.

FIG. 5 is a diagram illustrating an example 500 of a first discovery model for UEs performing sidelink communications, in accordance with the present disclosure. The first discovery model may be referred to as Model A. In the first discovery model, a first UE (e.g., UE-1, or an announcing UE) may transmit an announcement message shown by reference number 510. In some aspects, the announcement message may indicate one or more relay types that the first UE is capable of performing (e.g., L2 relaying, L2' relaying, and/or Layer 3 relaying, among other examples). For example, the announcement message may include a flag or field indicating the one or more relay types. One or more second UEs (e.g., UE-2 through UE-5, or monitoring UEs) may monitor for the announcement message. For the purposes described herein, the announcing UE may be the relay UE and the monitoring UEs may be the destination UEs. In some aspects, the announcement message may include FD information, such as as information indicating a capability relating to FD communication, a first indication of whether a UE can perform FD relaying based at least in part on a condition at the UE, a second indication of whether the UE can perform FD relaying associated with one or more beams, or the like, as described in more detail elsewhere herein.

As indicated above, FIG. 5 is provided as an example. Other examples may differ from what is described with respect to FIG. 5.

Figure 6:
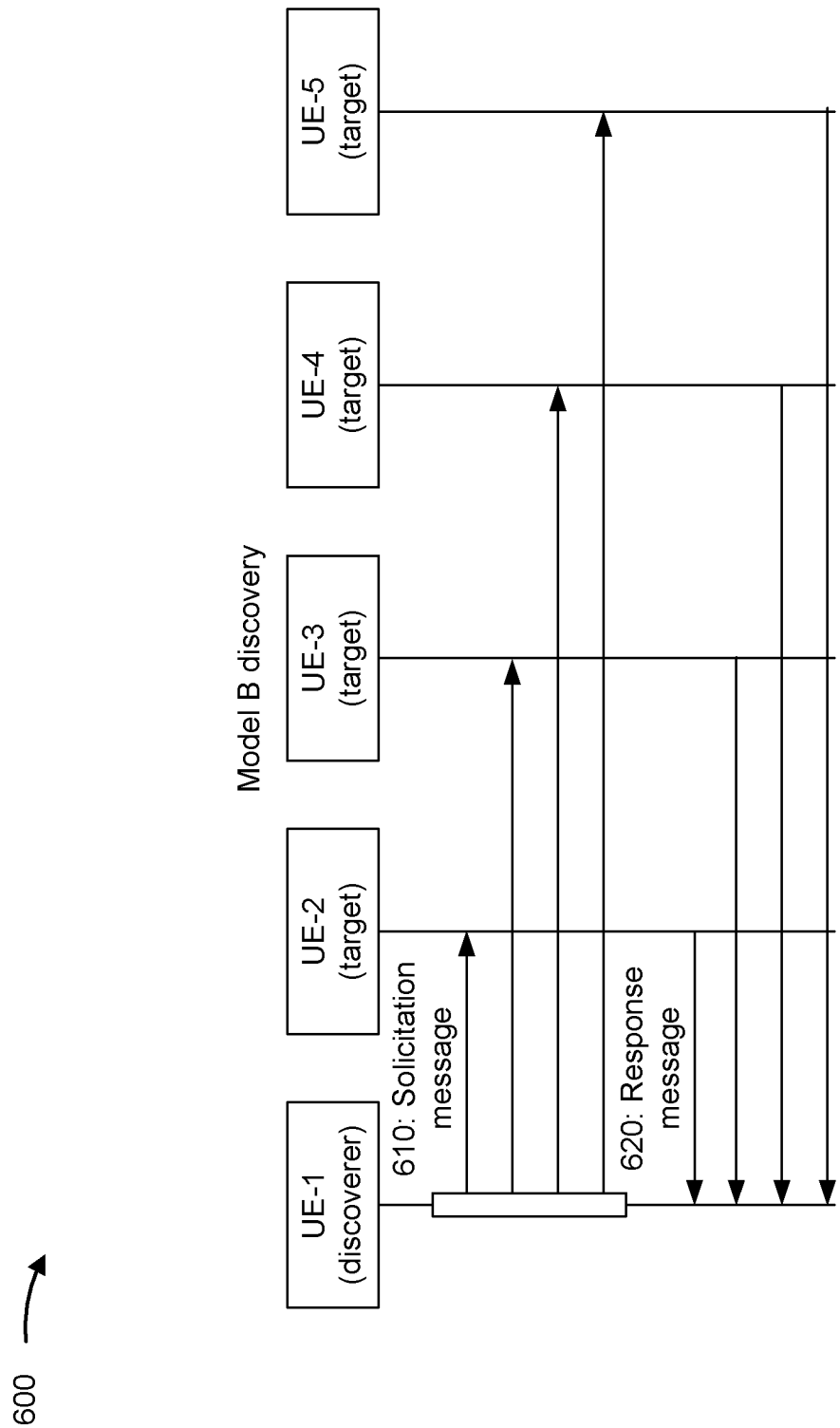
FIG. 6 is a diagram illustrating an example of a second discovery model for UEs performing sidelink communications, in accordance with the present disclosure.

FIG. 6 is a diagram illustrating an example 600 of a second discovery model for UEs performing sidelink communications, in accordance with the present disclosure. The second discovery model may be referred to as Model B. As shown, example 600 includes a discoverer UE (e.g., UE-1) and a set of target UEs (e.g., UE-2 through UE-5).

As shown by reference number 610, the discoverer UE may transmit a solicitation message. In some aspects, the solicitation message may indicate one or more relay types that the discoverer UE is capable of performing or desires to use (e.g., L2 relaying, L2' relaying, and/or Layer 3 relaying, among other examples). For example, the solicitation message may include a flag or field indicating the one or more relay types. As shown by reference number 620, target UEs that receive the solicitation message may provide a response message that indicates one or more relay types supported by the target UE. In some cases, a target UE may respond if the target UE receives the solicitation message and supports a relay type indicated by the solicitation message. For the purposes described herein, the discoverer UE may be the destination UE and the target UEs may be potential relay UEs for the destination UE. In some aspects, the solicitation message (also referred to as a discovery request message) may request information regarding the feasibility or performance of FD relaying. In some aspects, the information regarding the feasibility or performance of FD relaying may include at least part of the FD information described in connection with FIG. 5, above, and in more detail elsewhere herein.

As indicated above, FIG. 6 is provided as an example. Other examples may differ from what is described with respect to FIG. 6.

Figure 7:
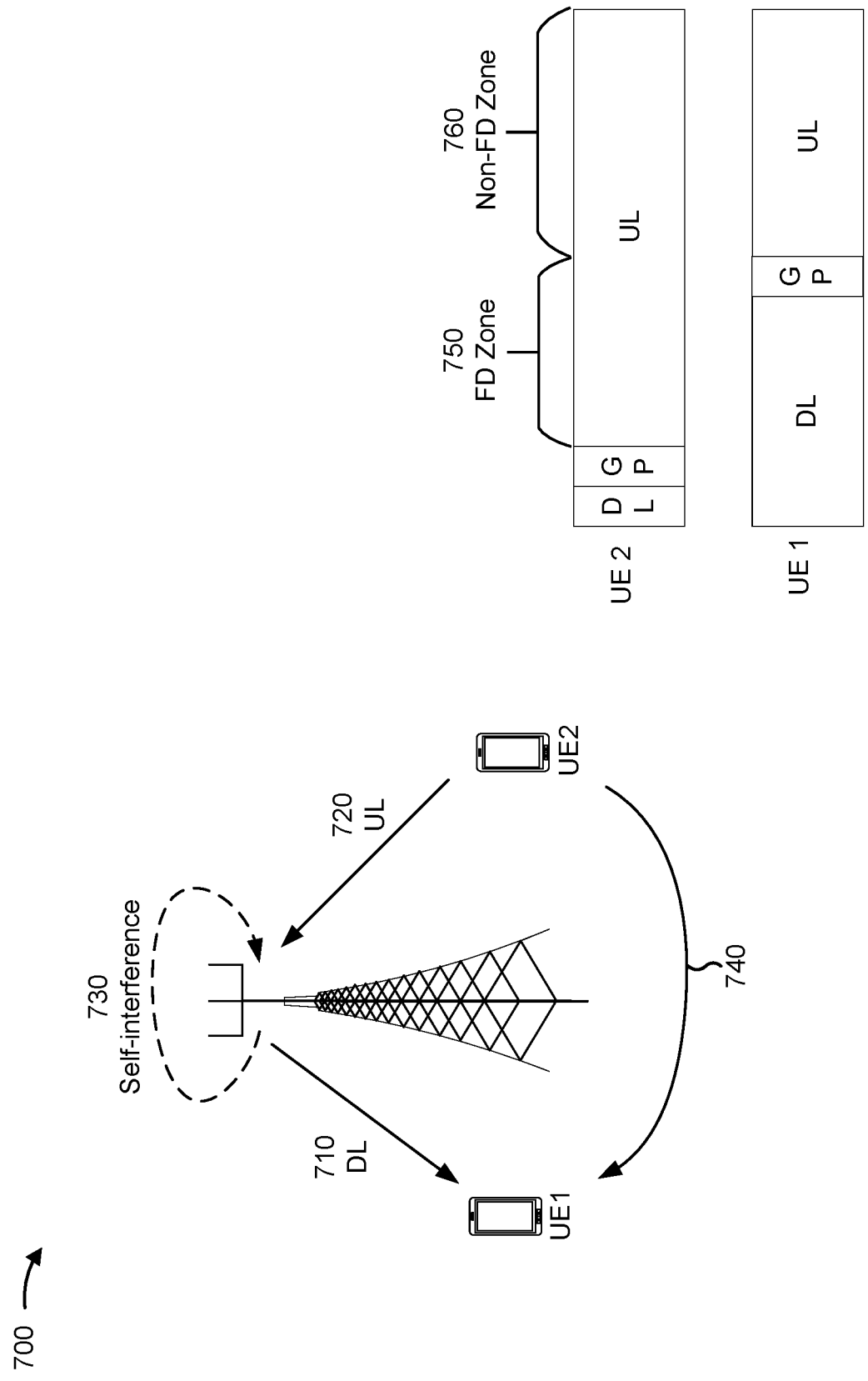
FIG. 7 is a diagram illustrating an example of a full-duplex (FD) zone, a non-FD zone, and self-interference associated with FD communications, in accordance with the present disclosure.

FIG. 7 is a diagram illustrating an example 700 of a FD zone, a non-FD zone, and self-interference associated with FD communications, in accordance with the present disclosure. As shown, example 700 includes a base station (e.g., base station 110), a UE1 (e.g., UE 120), and a UE2 (e.g., another UE 120). In some aspects, the base station may be capable of FD communication. FD communication may include a contemporaneous uplink and downlink communication using the same resources. For example, the base station may perform a downlink (DL) transmission to a UE1 (shown by reference number 710) and may receive an uplink (UL) transmission from a UE2 (shown by reference number 720) using the same frequency resources and at least partially overlapping in time.

As shown by reference number 730, the DL transmission from the base station may self-interfere with the UL transmission to the base station. This may be caused by a variety of factors, such as the higher transmit power for the DL transmission (as compared to the UL transmission) and/or radio frequency bleeding. Furthermore, as shown by reference number 740, the UL transmission to the base station from the UE2 may interfere with the DL transmission from the base station to the UE1, thereby diminishing DL performance of the UE1. While these self-interference conditions are described with reference to the base station, similar self-interference can occur at a UE performing simultaneous sidelink reception and transmission, or simultaneous communication on a sidelink and a radio access link. As used herein "radio access link" can include one or more of a downlink or an uplink.

An FD zone is shown by reference number 750 and a non-FD zone is shown by reference number 760. An "FD zone" may refer to a time period and/or a frequency region in which a wireless communication device (e.g., a base station 110, a UE 120, a node, or a similar device) performs FD communication, and a "non-FD zone" may refer to a time period and/or a frequency region in which a wireless communication device performs non-FD communication. The FD zone may be associated with higher self-interference, and therefore a lower signal-to-interference-plus-noise ratio (SINR), than the non-FD zone.

As indicated above, FIG. 7 is provided as an example. Other examples may differ from what is described with respect to FIG. 7.

Figure 8:
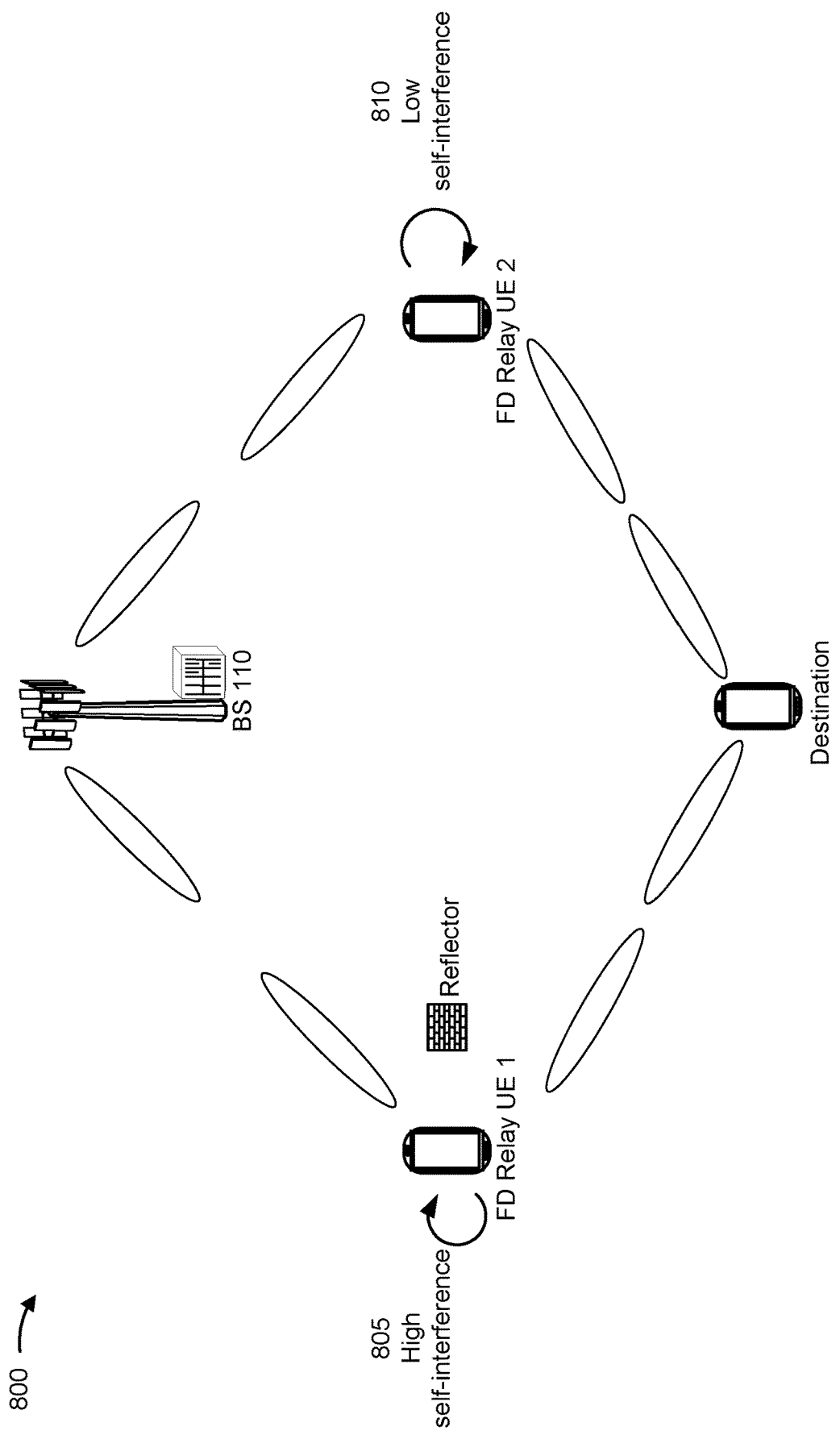
FIG. 8 is a diagram illustrating an example relating to relay UE selection, in accordance with the present disclosure.

FIG. 8 is a diagram illustrating an example 800 relating to relay UE selection, in accordance with the present disclosure. As shown in FIG. 8, a base station 110, a first FD relay UE (e.g., a first UE 120), a second FD relay UE (e.g., a second UE 120), and a destination UE (e.g., a third UE 120) may communicate with one another.

A UE (referred to herein as relay UE or an FD relay UE) may relay communications from another UE (referred to herein as a destination UE or a remote UE) to a network (e.g., the base station 110 or another network entity, such as a third-party server device (not shown)) or from the network to the destination UE. Communications between the relay UE and the remote UE may be via sidelink communications, as described elsewhere herein. In some instances, a relay UE may perform half-duplex relaying, in which only one of transmission or reception is performed at the relay UE at a given time. In other instances, a relay UE may perform FD relaying, in which the relay UE is simultaneously communicating with the base station 110 and the destination UE (which may be associated with some degree of self-interference). Transmissions of the base station 110 via some beams may also be expected to interfere with reception of the destination UE on particular beams, such as if the destination UE's receive beam is spatially aligned with the base station 110's transmit beam.

In some cases, the destination UE may perform a discovery process to identify a relay UE for performing a relay service to relay communications between the destination UE and the base station 110. For example, the destination UE may perform a model A discovery process or a model B discovery process, as described elsewhere herein. The destination UE may identify one or more relay UEs (e.g., the first FD relay UE and the second FD relay UE) for the relay service based at least in part on performing the discovery process.

In some circumstances, it may be undesirable for a relay UE to provide a relay service. For example, the relay UE may be associated with high self-interference (e.g., a level of self-interference that satisfies a threshold) associated with a beam pair preferred by the destination UE for performing the relay service. Additionally, in cases where the destination UE identifies multiple relay UEs, the destination UE may desire to select a relay UE that is able to perform FD communications and/or is associated with the most favorable conditions for performing a relay service via a beam pair preferred by the destination UE.

For example, as shown by reference number 805, the first FD relay UE may be associated with a high level of self-interference and, as shown by reference number 810, the second FD relay UE may be associated with a low level of self-interference. For example, the first FD relay UE's high level of self-interference may be due to an obstruction associated with the first FD relay UE (here, a reflector). However, the destination UE may lack information necessary to determine whether the first FD relay UE and/or the second FD relay UE are able to perform FD communications and/or to determine which of the first FD relay UE or the second FD relay UE is associated with the most favorable conditions for performing a relay service via a beam pair preferred by the destination UE relative to the other FD relay UE. Therefore, the destination UE may select a relay UE (e.g., the first FD relay UE) for performing the relay service that may be detrimental to a performance of the destination UE, the ability of the destination UE to communicate with the base station 110, or a user experience of the destination UE relative to utilizing another relay UE (e.g., the second FD relay UE) to provide the relay service.

Further, because the beam pair preferred by the destination UE is unknown to the relay UEs, the relay UEs (e.g., the first FD relay UE and the second FD relay UE) may not be able to determine whether the beam pair preferred by the destination UE is associated with strong self-interference. Therefore, a relay UE (e.g., the first FD relay UE) may determine to provide the relay service for the destination UE even when conditions associated with the relay UE are unfavorable for performing the relay service, which may be detrimental to a performance of the relay UE, the ability of the relay UE to provide the relay service, or a user experience of the relay UE to provide a relay service for the destination UE.

Some techniques and apparatuses described herein provide assistance information for FD relay UE selection. Assistance information is information provided to a destination UE (such as from a relay UE or a network device) that aids the destination UE in selecting an FD relay UE. For example, assistance information may include FD information, described in more detail below. In some aspects, a relay UE may receive a request for FD information associated with the relay UE from a destination UE. The FD information may include information that enables the destination UE to determine whether it is desirable to utilize the relay UE for a relay service. For example, the request may indicate that the relay UE is to provide information indicating a capability of the relay UE relating to FD communication, an indication of whether the relay UE can perform FD relaying based at least in part on a condition (e.g., self-interference associated with a beam pair preferred by the destination UE) at the relay UE, and/or an indication of whether the relay UE can perform FD relaying associated with a beam pair preferred by the destination UE, among other examples. The relay UE may provide the FD information to the destination UE based at least in part on the request. The destination UE may determine whether to utilize the relay UE for the relay service based at least in part on the relay information.

In this way, the destination UE can determine whether to utilize a relay UE for a relay service based at least in part on a capability of the relay UE relating to FD communication, whether the relay UE can perform FD relaying based at least in part a condition at the relay UE, and/or whether the relay UE can perform FD relaying associated with one or more beams preferred by the destination UE, thereby improving the performance of the relay service provided to the destination UE and resource utilization in a situation when the relay UE's performance or resource utilization would be negatively impacted by the relay service.

As indicated above, FIG. 8 is provided as an example. Other examples may differ from what is described with respect to FIG. 8.

Figure 9:
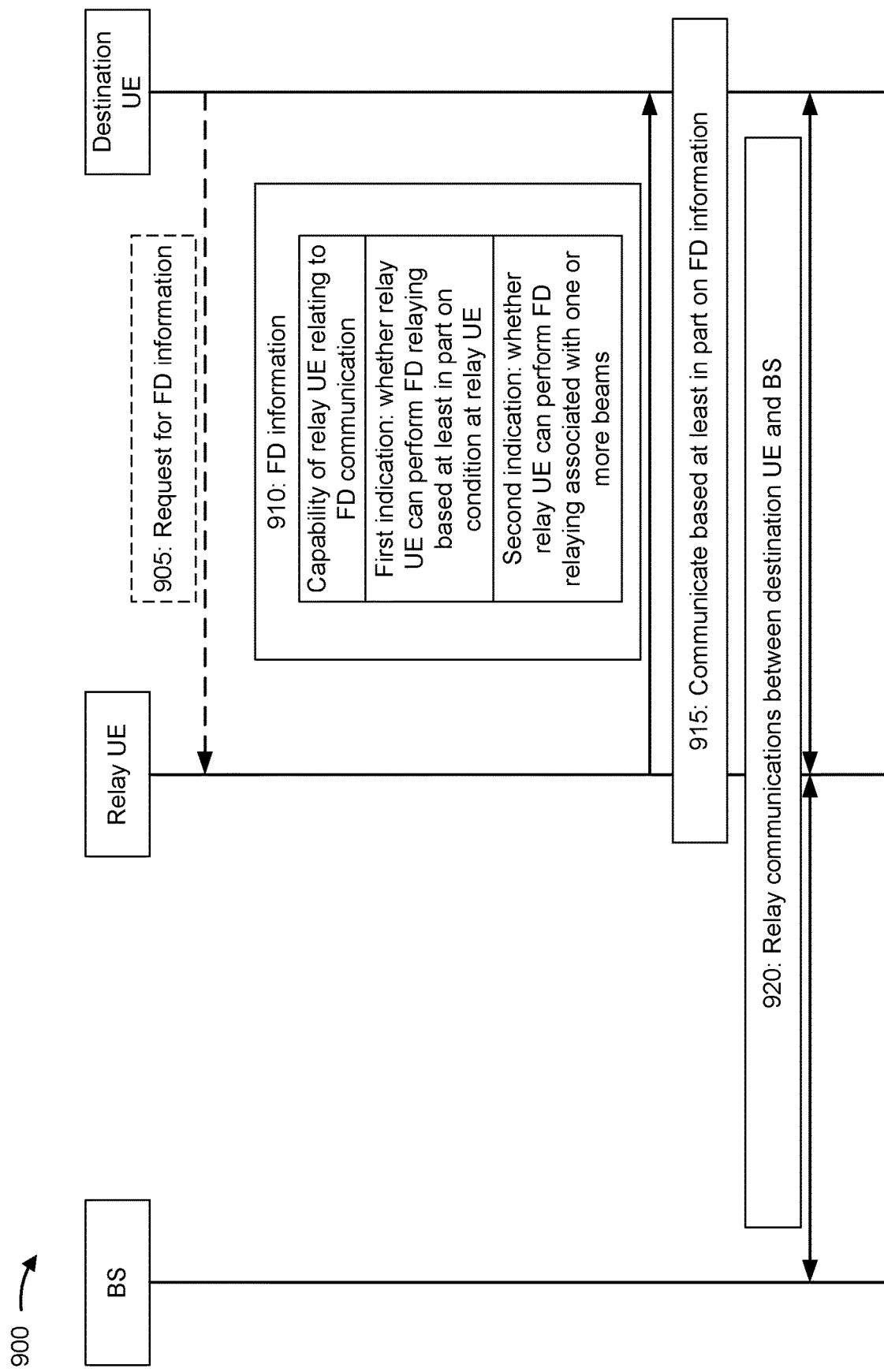
FIGS. 9 and 10 are diagrams illustrating examples associated with assistance information for FD relay UE selection, in accordance with the present disclosure.

FIG. 9 is a diagram illustrating an example 900 associated with assistance information for FD relay UE selection, in accordance with the present disclosure. As shown in FIG. 9, a relay UE (e.g., a first UE 120) may communicate with a destination UE (e.g., a second UE 120) and a base station (e.g., base station 110). In some aspects, the relay UE may communicate with the destination UE via sidelink communications (such as via a PC5 interface), as described elsewhere herein. In some aspects, the relay UE may communicate with the base station via access link communications (such as uplink or downlink communications via a Uu interface), as described elsewhere herein.

In some aspects, as shown by reference number 905, the destination UE may transmit a request for FD information to the relay UE. The relay UE and the remote UE may perform sidelink communications, and the remote UE may request (e.g., via the sidelink) FD information. The FD information may be associated with FD relay feasibility and/or information associated with FD relay performance, among other types of information associated with performing an FD relay.

In some aspects, the remote UE may request the information via a discovery request. For example, the destination UE perform a discovery process, such as a model A sidelink UE discovery process or a model B sidelink UE discovery process, as described elsewhere herein. The destination UE may provide the request via a message transmitted during the performance of the discovery process.

In some aspects, the request may indicate information to be included in the FD information. For example, the request may indicate that the FD information is to include an indication of a capability of the relay UE relating to FD communication, a first indication of whether the relay UE can perform FD relaying based at least in part on a condition at the relay UE, and/or a second indication of whether the relay UE can perform FD relaying associated with one or more beams, among other examples.

In some aspects, the relay UE may receive the request and may determine FD information associated with FD relay feasibility and/or information associated with FD relay performance, among other types of information associated with performing an FD relay process for the destination UE. For example, the request may include information indicating one or more beams preferred by the destination UE (e.g., one or more candidate beams). In some aspects, a beam may be preferred by the destination UE based at least in part on the beam being associated with a threshold quality (e.g., a quality metric that satisfies a threshold). The relay UE may determine a self-interference (SI) measurement associated with the one or more beams based at least in part on the one or more beams being identified in the request.

As shown by reference number 910, the relay UE may provide FD information to the destination UE. In some aspects, the relay UE may provide the FD information based at least in part on the request. In some aspects, the destination UE may request the information via a discovery request, and the relay UE may transmit the FD information via a discovery response message.

In some aspects, the relay UE may transmit the FD information prior to, or without, receiving a request for the FD information. For example, the relay UE may transmit the FD information to the remote UE to indicate an FD relay capability of the relay UE to the remote UE based at least in part on performing a discovery process, such as a mode A sidelink UE discovery process or a mode B sidelink UE discovery process, as described elsewhere herein.

In some aspects, the FD information is statically signaled by the FD relay UE or another network entity. In some aspects, the FD information is semi-statically signaled, such as via radio resource control (RRC) signaling. In some aspects, the relay UE may transmit the FD information directly to the destination UE. For example, the relay UE may transmit the FD information to the destination UE via sidelink communication, as described elsewhere herein. In some aspects, the relay UE may transmit the FD information indirectly to the destination UE, such as via a network entity, as described elsewhere herein and in connection with FIG. 10.

The FD information may include information associated with FD relay feasibility and/or information associated with FD relay performance, among other types of information associated with performing an FD relay process for the destination UE. For example, as shown in FIG. 9, the FD information may identify a capability of the relay UE relating to FD communication, a first indication of whether the relay UE can perform FD relaying based at least in part on a condition at the relay UE, and a second indication of whether the relay UE can perform FD relaying based at least in part on a condition at the relay UE.

In some aspects, the FD information may indicate the capability of the relay UE relating to FD communication. The capability may be a capability relating to bidirectional sidelink FD communication, a capability relating to FD relaying between a destination UE and a radio access node via the relay UE, a capability relating to FD relaying between sidelink UEs, or a capability relating to bidirectional radio access FD communication, among other examples. Bidirectional sidelink FD communication is communication involving simultaneous transmission and reception on a sidelink. FD relaying between a destination UE and a radio access node via a relay UE involves simultaneous communication on a radio access link with the radio access node (e.g., the base station 110) and on a sidelink with the destination UE. FD relaying between sidelink UEs involves simultaneous communication, by a relay UE, with a first UE and a second UE via respective sidelink connections with the first UE and the second UE. Bidirectional radio access FD communication involves simultaneous communication on an uplink and a downlink with a radio access node (e.g., the base station 110).

In some aspects, the FD information may include the first indication of whether the relay UE can perform FD relaying based at least in part on a condition at the relay UE. The first indication may be considered a node-level indicator of whether a UE can potentially perform FD relaying with a threshold quality. In some aspects, the condition at the relay UE is based at least in part on a SI measurement by the relay UE. In some aspects, the SI measurement is based at least in part on a transmission by the relay UE. In some aspects, the first indication is dynamically determined by the relay UE based at least in part on a current SI measurement. For example, the relay UE may determine a current SI measurement, which, in some aspects, may based at least in part on a movement of the relay UE. The movement of the relay UE may cause a current SI, determined at a current location, to be different from a previous SI determined at a previous location. Additionally, or alternatively, the movement of the relay UE and the SI of the relay UE may be separate factors in the determination of the condition at the relay UE.

In some aspects, the first indication may indicate that the relay UE can perform FD relaying when the SI measurement, for at least one beam pair of the relay UE, indicates an SI level that satisfies (e.g., is lower than) a threshold. In some aspects, the threshold may be indicated by the base station. For example, the base station may provide the relay UE with information indicating a threshold associated with FD relaying, an SI measurement associated with the relay UE, and/or an SI measurement associated with at least one beam pair of the relay UE, among other examples. Alternatively, and/or additionally, the threshold may be indicated in a specification (e.g., a specification associated with wireless communication and/or FD relaying, among other examples) and stored in a memory of the relay UE.

In some aspects, the condition at the relay UE is based at least in part on a mobility status of the relay UE. The mobility status of the relay UE may include a low mobility status (e.g., a movement of the relay UE is less than a threshold), a high mobility status (e.g., a movement of the relay UE is greater than a threshold), and/or a high mobility with fast channel variation (e.g., a channel variation, over time, is greater than a threshold) status, among other examples. In some aspects, the first indication may indicate that the relay UE cannot perform FD relaying (such as with a threshold quality) based at least in part on the mobility status of the relay UE being a high mobility with fast channel variation status.

In some aspects, the FD information may include the second indication of whether the relay UE can perform FD relaying associated with one or more beams. The one or more beams may be for communication between the relay UE and the destination UE. In some aspects, the one or more beams may comprise one or more candidate beam pairs of the relay UE. The one or more candidate beam pairs may include one or more beam pairs preferred by the destination UE.

In some aspects, the relay UE transmits the second indication via the one or more beams. For example, the second indication may be transmitted via a candidate beam for which the second indication carries relevant information, such as via an announcement message or a sidelink (SL) synchronization signal block on the candidate beam. In some aspects, the relay UE transmits the second indication via a beam other than the one or more beams, such as on a set of beam (e.g., all configured beams, a set of beams via beamsweeping, or the like).

In some aspects, the second indication may indicate whether the one or more beams can be used for relay-to-destination communication (e.g., downlink), destination-to-relay communication (e.g., uplink), or relay-to-destination and destination-to-relay (e.g., downlink and uplink) communication for the destination UE. In some aspects, the second indication may indicate, for the one or more beams, an SINR at the relay UE, an estimated MCS at the relay UE, and/or an estimated throughput at the relay UE, among other examples. The SINR, the MCS, and/or the estimated throughput may be measured at a receive beam of the relay UE associated with the destination UE and/or a receive beam of the relay UE associated with a radio access node, such as in the uplink direction, the downlink direction, or both.

In some aspects, the second indication may indicate whether the one or more beams can support FD relaying at a threshold level of quality. For example, the second indication may include a beam-level indicator associated with the one or more beams. In some aspects, the second indication indicates whether the one or more beams can support FD relaying at the threshold level of quality based at least in part on an SI level at the relay UE for the one or more beams. The SI level may be associated with interference from a transmit beam of the relay UE associated with the destination UE to a reception beam of the relay UE associated with a radio access node, or interference from a transmit beam of the relay UE associated with a radio access node to a reception beam of the relay UE associated with a destination UE.

As an example, the second indication may indicate that the relay UE can perform FD relaying associated with a first beam and/or that the relay UE cannot perform FD relaying associated with a second beam based at least in part on an SI level determined for the first beam being less than a threshold and/or an SI level determined for the second beam being greater than a threshold.

Alternatively, and/or additionally, the second indication may indicate whether the one or more beams can support FD relaying at the threshold level of quality based at least in part on a mobility status of the relay UE, as described elsewhere herein.

In some aspects, the FD information may include one or more additional indications. For example, the FD information may include an indication of a beam between the relay UE and a source node associated with the relay UE (e.g., the base station); an indication of an SI measurement per direction at the relay UE for the one or more beams; an indication of an SINR per relay direction at the relay UE, an indication of an estimated MCS per direction at the relay UE, and/or an indication of an estimated throughput per direction at the relay UE, among other examples.

In some aspects, the request may indicate information to be included in the FD information. For example, the request may indicate that the FD information is to include an indication of a capability of the relay UE relating to FD communication, a first indication of whether the relay UE can perform FD relaying based at least in part on a condition at the relay UE, and/or a second indication of whether the relay UE can perform FD relaying associated with one or more beams, among other examples. In these aspects, the FD information may include the information indicated in the request.

As shown by reference number 915, the relay UE and the destination UE may communicate based at least in part on the FD information. For example, as shown by reference number 920, the relay UE may relay communications between the destination UE and the base station. In some aspects, the destination UE, the relay UE, and the base station may establish a relaying configuration based at least in part on the FD information.

In some aspects, the destination UE may receive the FD information and may determine that the relay UE is able to perform FD relaying based at least in part on the FD information (e.g., the first indication). The destination UE and the relay UE may perform a communication based at least in part on the destination UE determining that the relay UE is able to perform FD relaying.

In some aspects, the destination UE receives the FD information transmitted by the relay UE and receives other FD information associated with another relay UE. In some aspects, the destination UE may select the relay UE (or the other relay UE) for relaying communications based at least in part on a first indication included in the FD information transmitted by the relay UE and a first indication included in the other FD information.

In some aspects, the destination UE may select the relay UE (or the other relay UE) for relaying communications based at least in part on a second indication included in the FD information transmitted by the relay UE and a second indication included in the other FD information. For example, the second indications may indicate whether the relay UE and the other relay UE can perform FD relaying associated with a beam pair indicated by the destination UE (e.g., a preferred beam pair indicated in a request for FD information transmitted by the destination UE) at a threshold level of quality. The destination UE may select the relay UE or the other relay UE for relaying communications based at least in part on whether the relay UE or the other relay UE can perform FD relaying associated with the beam pair indicated by the destination UE at a threshold level of quality.

In some aspects, the relay UE and the other relay UE may both be able to perform FD relaying associated with the beam pair indicated by the destination UE at a threshold level of quality and the destination UE may select the relay UE (or the other relay UE) based at least in part on the relay UE being able to perform FD relaying associated with the beam pair indicated by the destination UE at a higher level of quality relative to the other relay UE.

As indicated above, FIG. 9 is provided as an example. Other examples may differ from what is described with respect to FIG. 9.

Figure 10:
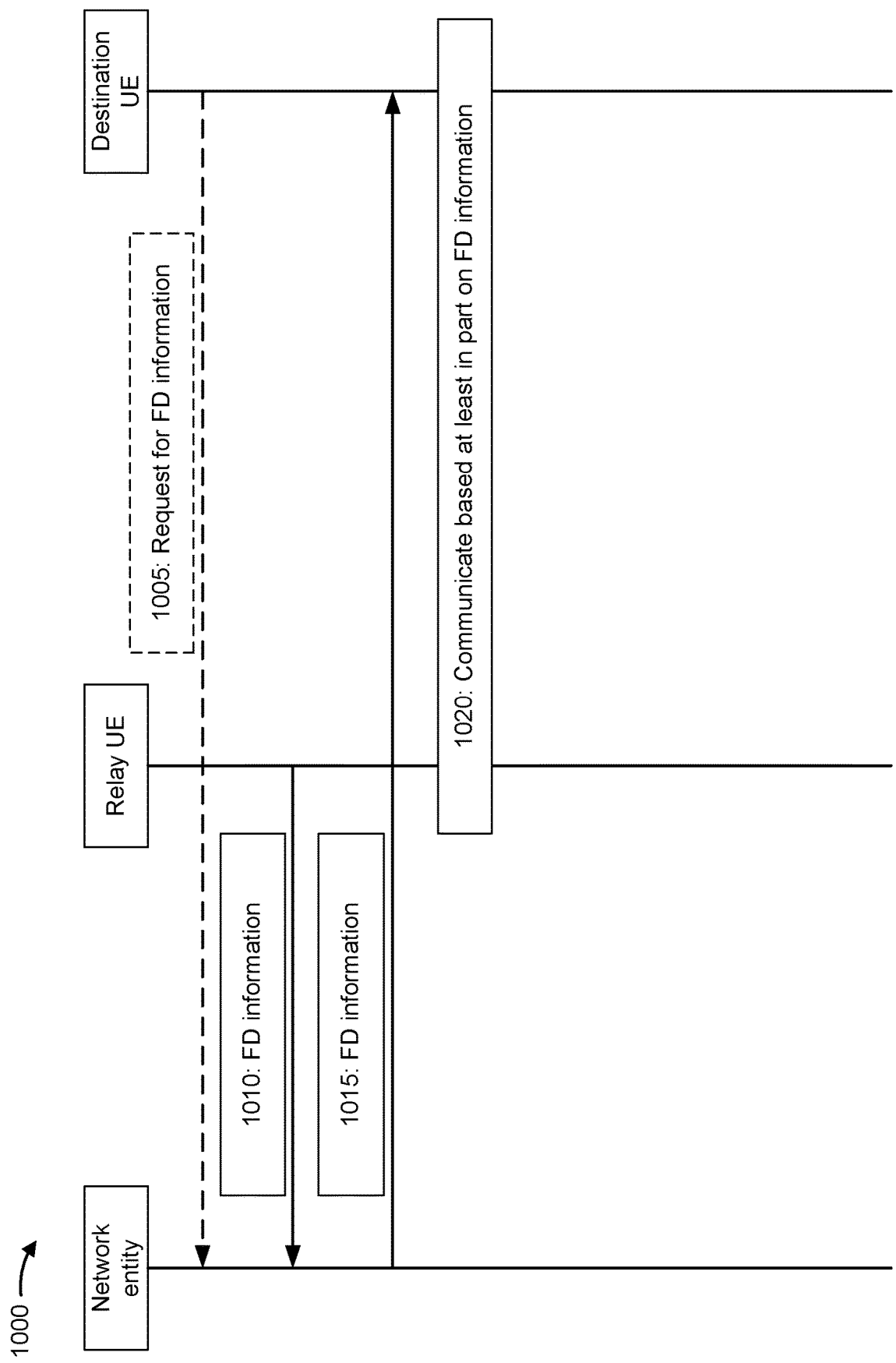

FIG. 10 is a diagram illustrating an example 1000 associated with assistance information for FD relay UE selection, in accordance with the present disclosure. As shown in FIG. 10, a relay UE (e.g., a first UE 120) may communicate with a destination UE (e.g., a second UE 120) and a network entity (e.g., a wireless node, such as a base station 110, a UE 120, or a third-party server device, among other examples). In some aspects, the relay UE may communicate with the destination UE via sidelink communications, as described elsewhere herein.

In some aspects, the relay UE may communicate with the network entity via access link communications. For example, the network entity may include a base station, and the relay UE may communicate with the base station via access link communications, as described elsewhere herein. In some aspects, the relay UE may communicate with the network entity via sidelink communications. For example, the network entity may include a UE, and the relay UE may communicate with the UE via sidelink communications, as described elsewhere herein. In some aspects, the network entity may communicate with the relay UE and/or the destination UE via a cellular connection, a WiFi connection, a Bluetooth connection, a wired connection, or the like.

In some aspects, as shown by reference number 1005, the destination UE may provide a request for FD information to the network entity. The request may indicate that the network entity is to provide FD information associated with the relay UE. For example, the request may indicate that the network entity is to provide FD information associated with FD relay feasibility of the relay UE and/or information associated with FD relay performance for the relay UE, among other types of information associated with the relay UE performing an FD relay.

As shown by reference number 1010, the relay UE may provide the FD information to the network entity. The FD information may be statically or semi-statically signaled to the network entity.

In some aspects, the relay UE may provide the FD information to the network entity based at least in part on receiving a request for the FD information. In some aspects, the request may indicate information to be included in the FD information. For example, the request may indicate that the FD information is to include an indication of a capability of the relay UE relating to FD communication, a first indication of whether the relay UE can perform FD relaying based at least in part on a condition at the relay UE, and/or a second indication of whether the relay UE can perform FD relaying associated with one or more beams, among other examples, as described elsewhere herein. The relay UE may provide FD information that includes the information indicated in the request to the network entity based at least in part on receiving the request from the network entity.

In some aspects, the relay UE may provide the FD information to the network entity based at least in part on information received from another wireless node. For example, the network entity and/or the destination UE may provide information indicating that the relay UE is to provide the FD information to the destination UE via the network entity.

As shown by reference number 1015, the network entity may provide the FD information to the destination UE. The network entity may provide the FD information to the destination UE based at least in part on receiving the FD information from the relay UE.

As shown by reference number 1020, the relay UE and the destination UE may communicate based at least in part on the FD information. For example, the relay UE may relay communications between the destination UE and another wireless node (e.g., the network entity, a base station 110, or a UE 120, among other examples) based at least in part on the FD information, as described elsewhere herein.

In some aspects, the destination UE may receive the FD information from the network entity and may determine that the relay UE is able to perform FD relaying based at least in part on the FD information (e.g., the first indication). The destination UE and the relay UE may perform a communication based at least in part on the destination UE determining that the relay UE is able to perform FD relaying.

In some aspects, the destination UE may receive, from the network entity, the FD information associated with the relay UE and may receive other FD information associated with another relay UE (e.g., from the network entity, from another network entity, and/or from the other relay UE). In some aspects, the destination UE may select the relay UE or the other relay UE for relaying communications based at least in part on the FD information associated with the relay UE and the other FD information, as described elsewhere herein.

As indicated above, FIG. 10 is provided as an example. Other examples may differ from what is described with respect to FIG. 10.

Figure 11:
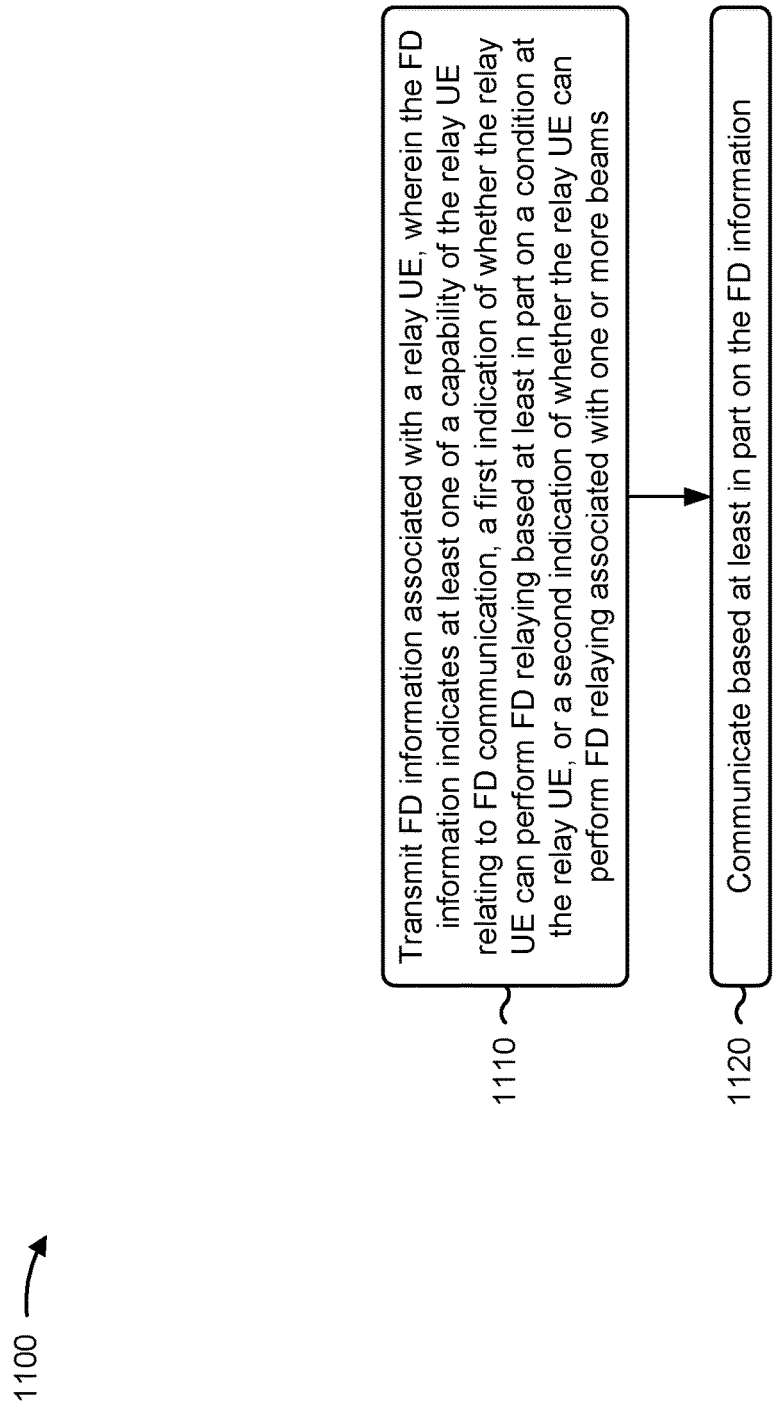
FIGS. 11-13 are diagrams illustrating example processes associated with assistance information for FD relay UE selection, in accordance with the present disclosure.

FIG. 11 is a diagram illustrating an example process 1100 performed, for example, by a relay UE, in accordance with the present disclosure. Example process 1100 is an example where the relay UE (e.g., UE 120) performs operations associated with assistance information for FD relay UE selection.

As shown in FIG. 11, in some aspects, process 1100 may include transmitting FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams (block 1110). For example, the relay UE (e.g., using communication manager 140 and/or transmission component 1404, depicted in FIG. 14) may transmit FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams, as described above.

As further shown in FIG. 11, in some aspects, process 1100 may include communicating based at least in part on the FD information (block 1120). For example, the relay UE (e.g., using communication manager 140, reception component 1402, and/or transmission component 1404, depicted in FIG. 14) may communicate based at least in part on the FD information, as described above.

Process 1100 may include additional aspects, such as any single aspect or any combination of aspects described below and/or in connection with one or more other processes described elsewhere herein.

In a first aspect, the capability is at least one of a capability relating to bidirectional sidelink FD communication, a capability relating to FD relaying between a destination UE and a radio access node via the relay UE, a capability relating to FD relaying between sidelink UEs, or a capability relating to bidirectional radio access FD communication.

In a second aspect, alone or in combination with the first aspect, the FD information indicating the capability is statically or semi-statically signaled.

In a third aspect, alone or in combination with one or more of the first and second aspects, the condition at the relay UE is based at least in part on a self-interference measurement by the relay UE.

In a fourth aspect, alone or in combination with one or more of the first through third aspects, the first indication indicates that the relay UE can perform FD relaying if the self-interference measurement, for at least one beam pair of the relay UE, indicates a self-interference level that is lower than a threshold.

In a fifth aspect, alone or in combination with one or more of the first through fourth aspects, the self-interference measurement is based at least in part on a transmission by the relay UE.

In a sixth aspect, alone or in combination with one or more of the first through fifth aspects, the condition at the relay UE is based at least in part on a mobility status of the relay UE.

In a seventh aspect, alone or in combination with one or more of the first through sixth aspects, the one or more beams comprise one or more candidate beam pairs of the relay UE.

In an eighth aspect, alone or in combination with one or more of the first through seventh aspects, the second indication indicates whether the one or more beams can support FD relaying at a threshold level of quality.

In a ninth aspect, alone or in combination with one or more of the first through eighth aspects, whether the one or more beams can support FD relaying at the threshold level of quality is based at least in part on at least one of an SI measurement by the relay UE or a mobility status of the relay UE.

In a tenth aspect, alone or in combination with one or more of the first through ninth aspects, the second indication is transmitted via the one or more beams.

In an eleventh aspect, alone or in combination with one or more of the first through tenth aspects, the second indication is transmitted via a beam other than the one or more beams.

In a twelfth aspect, alone or in combination with one or more of the first through eleventh aspects, the one or more beams are for communication between the relay UE and a destination UE, and wherein the second indication indicates whether the one or more beams can be used for relay-to-destination communication, destination-to-relay communication, or relay-to-destination and destination-to-relay communication.

In a thirteenth aspect, alone or in combination with one or more of the first through twelfth aspects, the FD information indicates a beam between the relay UE and a base station.

In a fourteenth aspect, alone or in combination with one or more of the first through thirteenth aspects, the second indication indicates an SI level at the relay UE for the one or more beams, wherein the SI level is associated with at least one of interference from a transmit beam of the relay UE associated with a destination UE to a reception beam of the relay UE associated with a radio access node, or interference from a transmit beam of the relay UE associated with a radio access node to a reception beam of the relay UE associated with a destination UE.

In a fifteenth aspect, alone or in combination with one or more of the first through fourteenth aspects, the second indication indicates, for the one or more beams, at least one of an SINR at the relay UE, an estimated MCS at the relay UE, or an estimated throughput at the relay UE.

In a sixteenth aspect, alone or in combination with one or more of the first through fifteenth aspects, the SINR, the MCS, or the estimated throughput is measured at one of a receive beam of the relay UE associated with a destination UE, or a receive beam of the relay UE associated with a radio access node.

In a seventeenth aspect, alone or in combination with one or more of the first through sixteenth aspects, process 1100 includes receiving a request for the FD information from a destination UE, wherein transmitting the FD information is based at least in part on the request.

In an eighteenth aspect, alone or in combination with one or more of the first through seventeenth aspects, process 1100 includes transmitting information indicating the capability of the relay UE relating to FD communication prior to receiving the request.

In a nineteenth aspect, alone or in combination with one or more of the first through eighteenth aspects, the request is received via a discovery request associated with sidelink UE discovery.

In a twentieth aspect, alone or in combination with one or more of the first through nineteenth aspects, the request indicates which FD information, of the capability, the first indication, or the second indication, is to be provided.

In a twenty-first aspect, alone or in combination with one or more of the first through twentieth aspects, the FD information is transmitted via a discovery response message.

In a twenty-second aspect, alone or in combination with one or more of the first through twenty-first aspects, transmitting the FD information further comprises transmitting the FD information to a network entity.

In a twenty-third aspect, alone or in combination with one or more of the first through twenty-second aspects, transmitting the FD information to the network entity is initiated by the network entity or by a destination UE.

In a twenty-fourth aspect, alone or in combination with one or more of the first through twenty-third aspects, transmitting the FD information further comprises transmitting the FD information to a destination UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
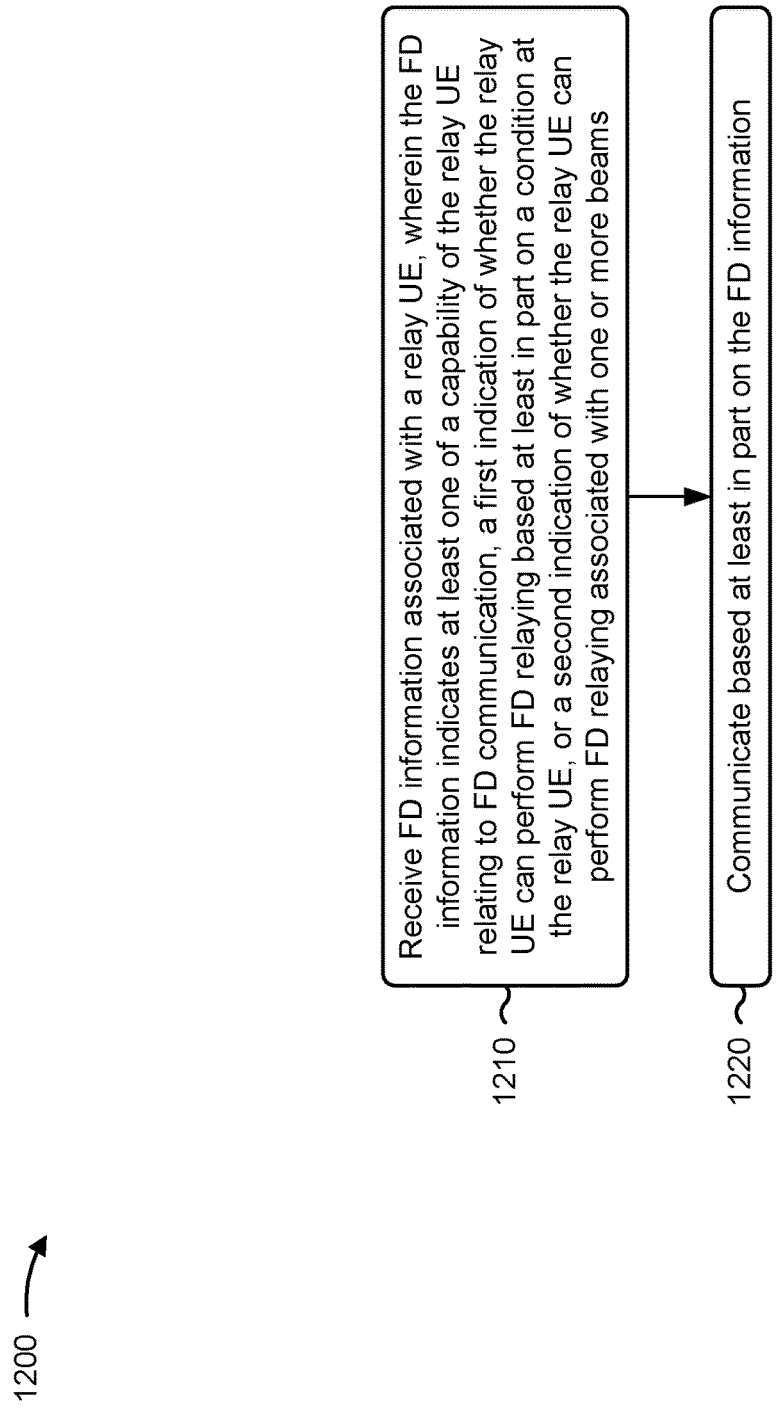

FIG. 12 is a diagram illustrating an example process 1200 performed, for example, by a destination UE, in accordance with the present disclosure. Example process 1200 is an example where the destination UE (e.g., UE 120) performs operations associated with assistance information for FD relay UE selection.

As shown in FIG. 12, in some aspects, process 1200 may include receiving FD information associated with a relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams (block 1210). For example, the destination UE (e.g., using communication manager 140 and/or reception component 1502, depicted in FIG. 15) may FD information associated with a relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams, as described above.

As further shown in FIG. 12, in some aspects, process 1200 may include communicating based at least in part on the FD information (block 1220). For example, the destination UE (e.g., using communication manager 140, reception component 1502, and/or transmission component 1504, depicted in FIG. 15) may communicate based at least in part on the FD information, as described above.

Process 1200 may include additional aspects, such as any single aspect or any combination of aspects described below and/or in connection with one or more other processes described elsewhere herein.

In a first aspect, the capability is at least one of a capability relating to bidirectional sidelink FD communication, a capability relating to FD relaying between the destination UE and a radio access node via the relay UE, a capability relating to FD relaying between sidelink UEs, or a capability relating to bidirectional radio access FD communication.

In a second aspect, alone or in combination with the first aspect, the FD information indicating the capability is statically or semi-statically signaled.

In a third aspect, alone or in combination with one or more of the first and second aspects, the condition at the relay UE is based at least in part on an SI measurement by the relay UE.

In a fourth aspect, alone or in combination with one or more of the first through third aspects, the first indication indicates that the relay UE can perform FD relaying if the SI measurement, for at least one beam pair of the relay UE, indicates a SI level that is lower than a threshold.

In a fifth aspect, alone or in combination with one or more of the first through fourth aspects, the one or more beams comprise one or more candidate beam pairs of the relay UE.

In a sixth aspect, alone or in combination with one or more of the first through fifth aspects, the second indication indicates whether the one or more beams can support FD relaying at a threshold level of quality.

In a seventh aspect, alone or in combination with one or more of the first through sixth aspects, the second indication is received via the one or more beams.

In an eighth aspect, alone or in combination with one or more of the first through seventh aspects, the second indication is received via a beam other than the one or more beams.

In a ninth aspect, alone or in combination with one or more of the first through eighth aspects, the one or more beams are for communication between the relay UE and the destination UE, and wherein the second indication indicates whether the one or more beams can be used for relay-to-destination communication, destination-to-relay communication, or relay-to-destination and destination-to-relay communication.

In a tenth aspect, alone or in combination with one or more of the first through ninth aspects, the FD information indicates a beam between the relay UE and a base station.

In an eleventh aspect, alone or in combination with one or more of the first through tenth aspects, the second indication indicates an SI level at the relay UE for the one or more beams, wherein the SI level is associated with at least one of: interference from a transmit beam of the relay UE associated with a destination UE to a reception beam of the relay UE associated with a radio access node, or interference from a transmit beam of the relay UE associated with a radio access node to a reception beam of the relay UE associated with a destination UE.

In a twelfth aspect, alone or in combination with one or more of the first through eleventh aspects, the second indication indicates, for the one or more beams, at least one of an SINR at the relay UE, an estimated MCS at the relay UE, or an estimated throughput at the relay UE.

In a thirteenth aspect, alone or in combination with one or more of the first through twelfth aspects, the SINR, the MCS, or the estimated throughput is measured at one of a receive beam of the relay UE associated with a destination UE, or a receive beam of the relay UE associated with a radio access node.

In a fourteenth aspect, alone or in combination with one or more of the first through thirteenth aspects, process 1200 includes transmitting a request for the FD information, wherein transmitting the FD information is based at least in part on the request.

In a fifteenth aspect, alone or in combination with one or more of the first through fourteenth aspects, process 1200 includes receiving information indicating the capability prior to transmitting the request, wherein transmitting the request is based at least in part on the information indicating the capability.

In a sixteenth aspect, alone or in combination with one or more of the first through fifteenth aspects, the request is transmitted via a discovery request associated with sidelink UE discovery.

In a seventeenth aspect, alone or in combination with one or more of the first through sixteenth aspects, the request indicates which FD information, of the capability, the first indication, or the second indication, is to be provided.

In an eighteenth aspect, alone or in combination with one or more of the first through seventeenth aspects, the FD information is received via a discovery response message.

In a nineteenth aspect, alone or in combination with one or more of the first through eighteenth aspects, receiving the FD information further comprises receiving the FD information from a network entity.

In a twentieth aspect, alone or in combination with one or more of the first through nineteenth aspects, receiving the FD information from the network entity is initiated by the destination UE.

In a twenty-first aspect, alone or in combination with one or more of the first through twentieth aspects, the relay UE is a first relay UE, and wherein the method further comprises receiving FD information from a second relay UE, and selecting a relay UE, of the first relay UE and the second relay UE, for relaying communications based at least in part on respective first indications of whether the first relay UE and the second relay UE can perform FD relaying.

In a twenty-second aspect, alone or in combination with one or more of the first through twenty-first aspects, the relay UE is a first relay UE, and wherein the method further comprises receiving FD information from a second relay UE, and selecting a relay UE, of the first relay UE and the second relay UE, for relaying communications based at least in part on respective second indications of whether the first relay UE and the second relay UE can perform FD relaying associated with a preferred candidate beam of the destination UE, wherein the preferred candidate beam is associated with a threshold quality.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
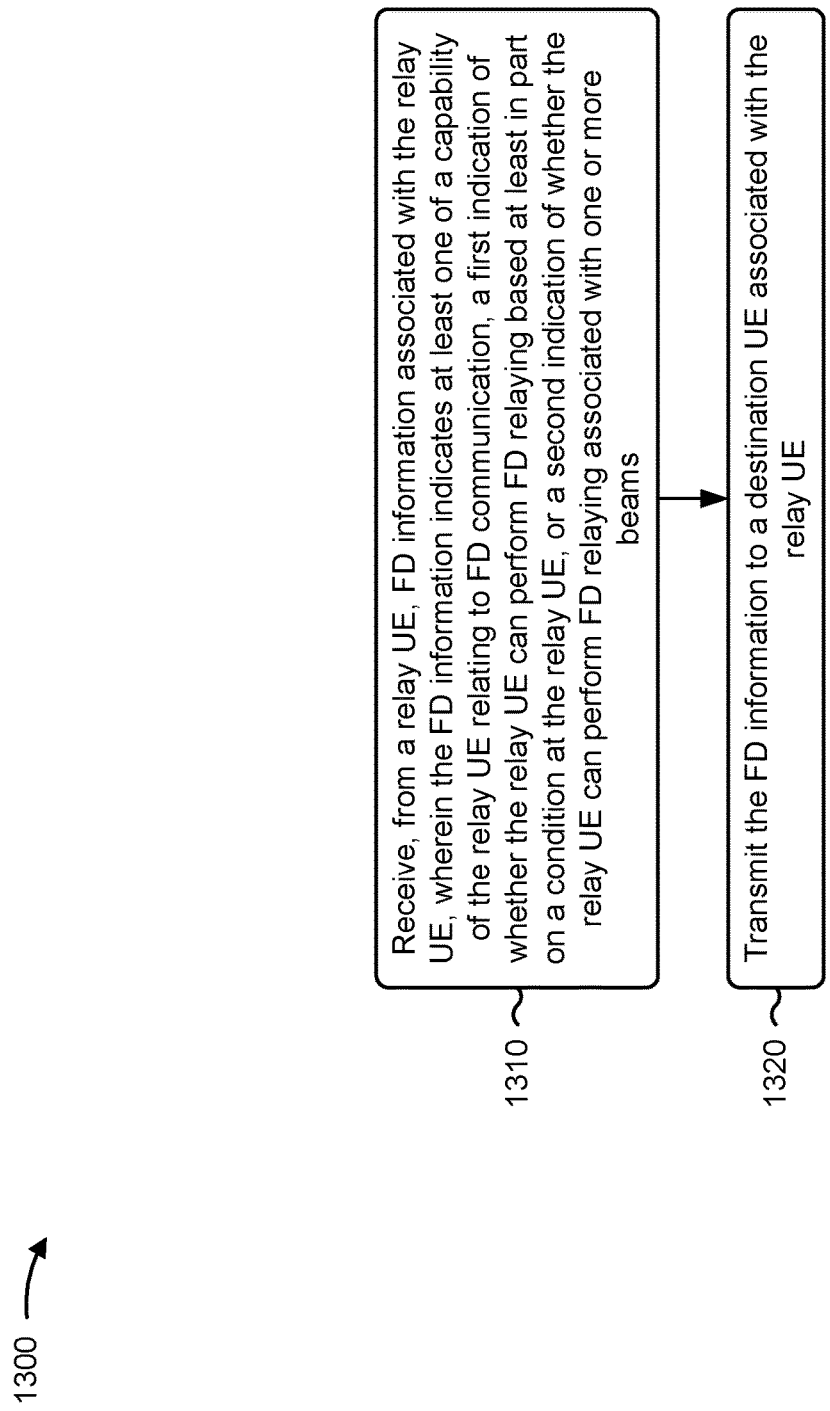

FIG. 13 is a diagram illustrating an example process 1300 performed, for example, by a network entity, in accordance with the present disclosure. Example process 1300 is an example where the network entity (e.g., base station 110) performs operations associated with assistance information for FD relay UE selection.

As shown in FIG. 13, in some aspects, process 1300 may include receiving, from an relay UE, FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams (block 1310). For example, the network entity (e.g., using communication manager 150 and/or reception component 1602, depicted in FIG. 16) may receive, from an relay UE, FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams, as described above.

As further shown in FIG. 13, in some aspects, process 1300 may include transmitting the FD information to a destination UE associated with the relay UE (block 1320). For example, the network entity (e.g., using communication manager 150 and/or transmission component 1604, depicted in FIG. 16) may transmit the FD information to a destination UE associated with the relay UE, as described above.

Process 1300 may include additional aspects, such as any single aspect or any combination of aspects described below and/or in connection with one or more other processes described elsewhere herein.

In a first aspect, the network entity is associated with a server or a controller.

In a second aspect, alone or in combination with the first aspect, process 1300 includes receiving, from at least one of the destination UE or the relay UE, a request for the FD information, wherein transmitting the FD information is based at least in part on the request.

In a third aspect, alone or in combination with one or more of the first and second aspects, the request is received prior to receiving the FD information, and wherein receiving the FD information further comprises obtaining the FD information based at least in part on the request.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
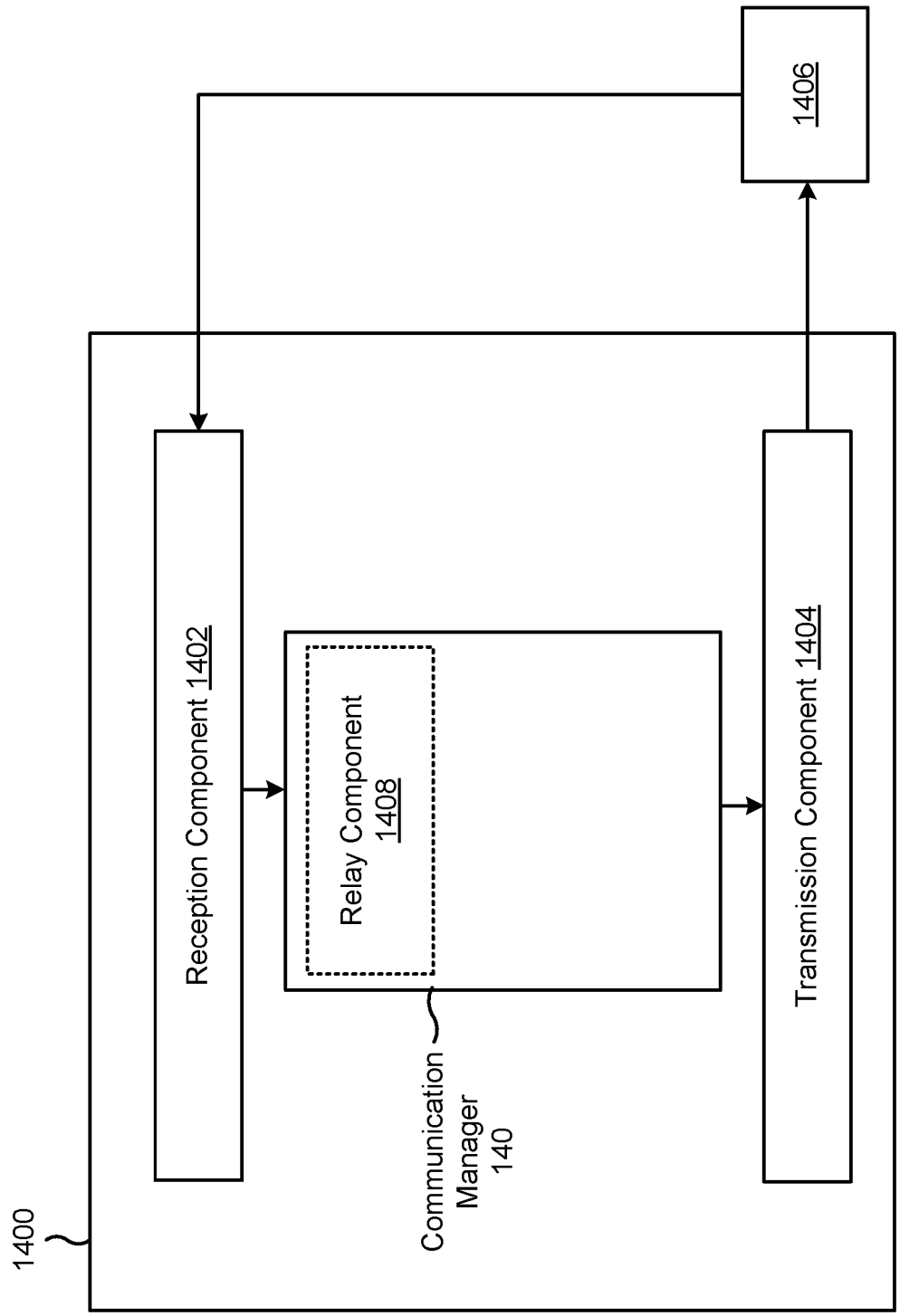
FIGS. 14-16 are diagrams of example apparatuses for wireless communication, in accordance with the present disclosure.

FIG. 14 is a diagram of an example apparatus 1400 for wireless communication. The apparatus 1400 may be a relay UE, or a relay UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a relay component 1408, among other examples.

In some aspects, the apparatus 1400 may be configured to perform one or more operations described herein in connection with FIGS. 9 and 10. Additionally, or alternatively, the apparatus 1400 may be configured to perform one or more processes described herein, such as process 1100 of FIG. 11. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a modem, a demodulator, a MIMO detector, a receive processor, a controller/processor, a memory, or a combination thereof, of the relay UE described in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the relay UE described in connection with FIG. 2. In some aspects, the transmission component 1404 may be co-located with the reception component 1402 in a transceiver.

The transmission component 1404 may transmit FD information associated with the relay UE, wherein the FD information indicates at least one of a capability of the relay UE relating to FD communication, a first indication of whether the relay UE can perform FD relaying based at least in part on a condition at the relay UE, or a second indication of whether the relay UE can perform FD relaying associated with one or more beams. The relay component 1408 may perform a communication based at least in part on the FD information.

The reception component 1402 may receive a request for the FD information from a destination UE, wherein transmitting the FD information is based at least in part on the request.

The transmission component 1404 may transmit information indicating the capability of the relay UE relating to FD communication prior to receiving the request.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
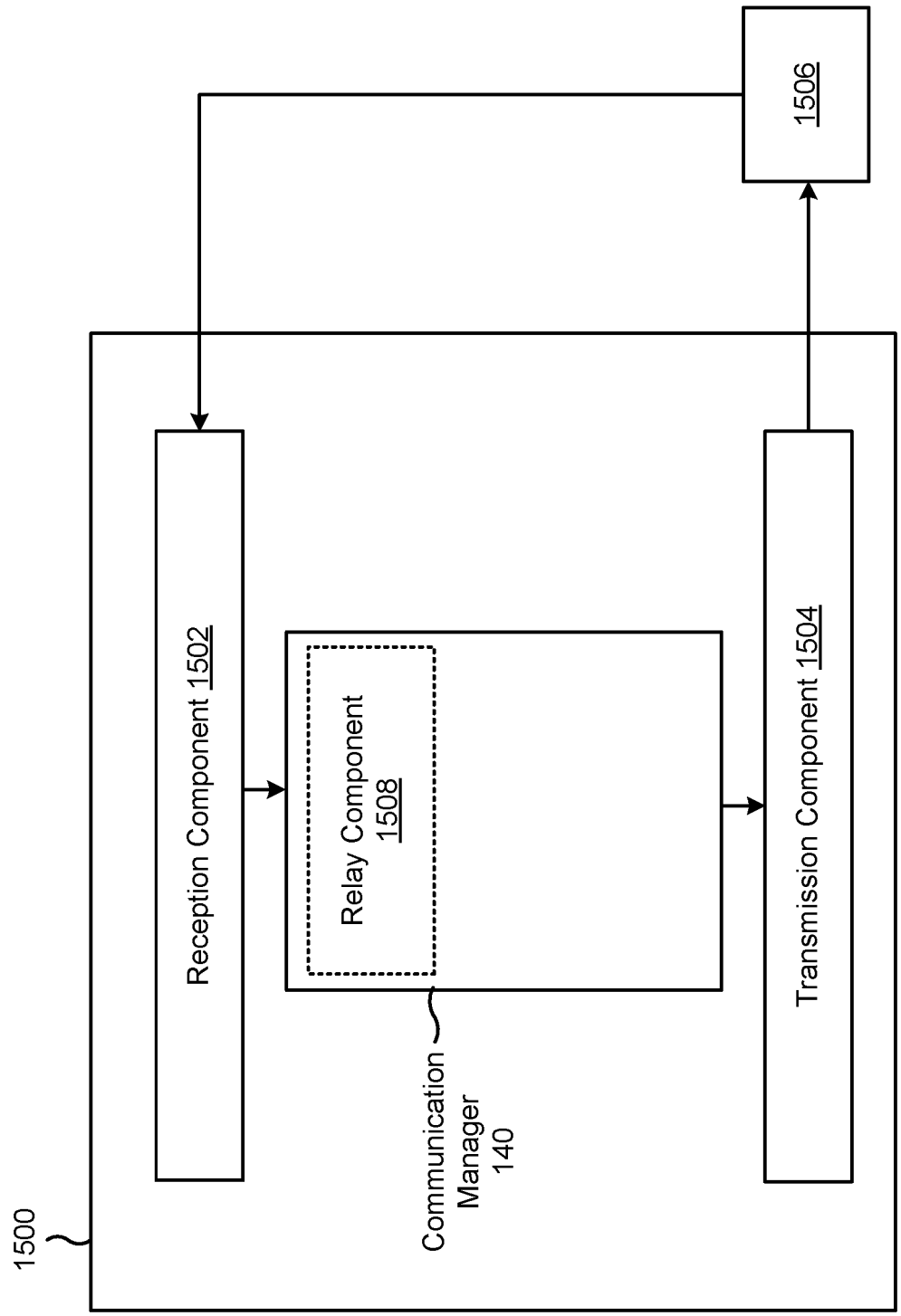

FIG. 15 is a diagram of an example apparatus 1500 for wireless communication. The apparatus 1500 may be a destination UE, or a destination UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may a relay component 1508, among other examples.

In some aspects, the apparatus 1500 may be configured to perform one or more operations described herein in connection with FIGS. 9 and 10. Additionally, or alternatively, the apparatus 1500 may be configured to perform one or more processes described herein, such as process 1200 of FIG. 12. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a modem, a demodulator, a MIMO detector, a receive processor, a controller/processor, a memory, or a combination thereof, of the destination UE described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the destination UE described in connection with FIG. 2. In some aspects, the transmission component 1504 may be co-located with the reception component 1502 in a transceiver.

The reception component 1502 may receive FD information associated with a relay UE, wherein the FD information indicates at least one of a capability of the relay UE relating to FD communication, a first indication of whether the relay UE can perform FD relaying based at least in part on a condition at the relay UE, or a second indication of whether the relay UE can perform FD relaying associated with one or more beams. The relay component 1508 may perform a communication based at least in part on the FD information.

The transmission component 1504 may transmit a request for the FD information, wherein transmitting the FD information is based at least in part on the request.

The reception component 1502 may receive information indicating the capability prior to transmitting the request, wherein transmitting the request is based at least in part on the information indicating the capability.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
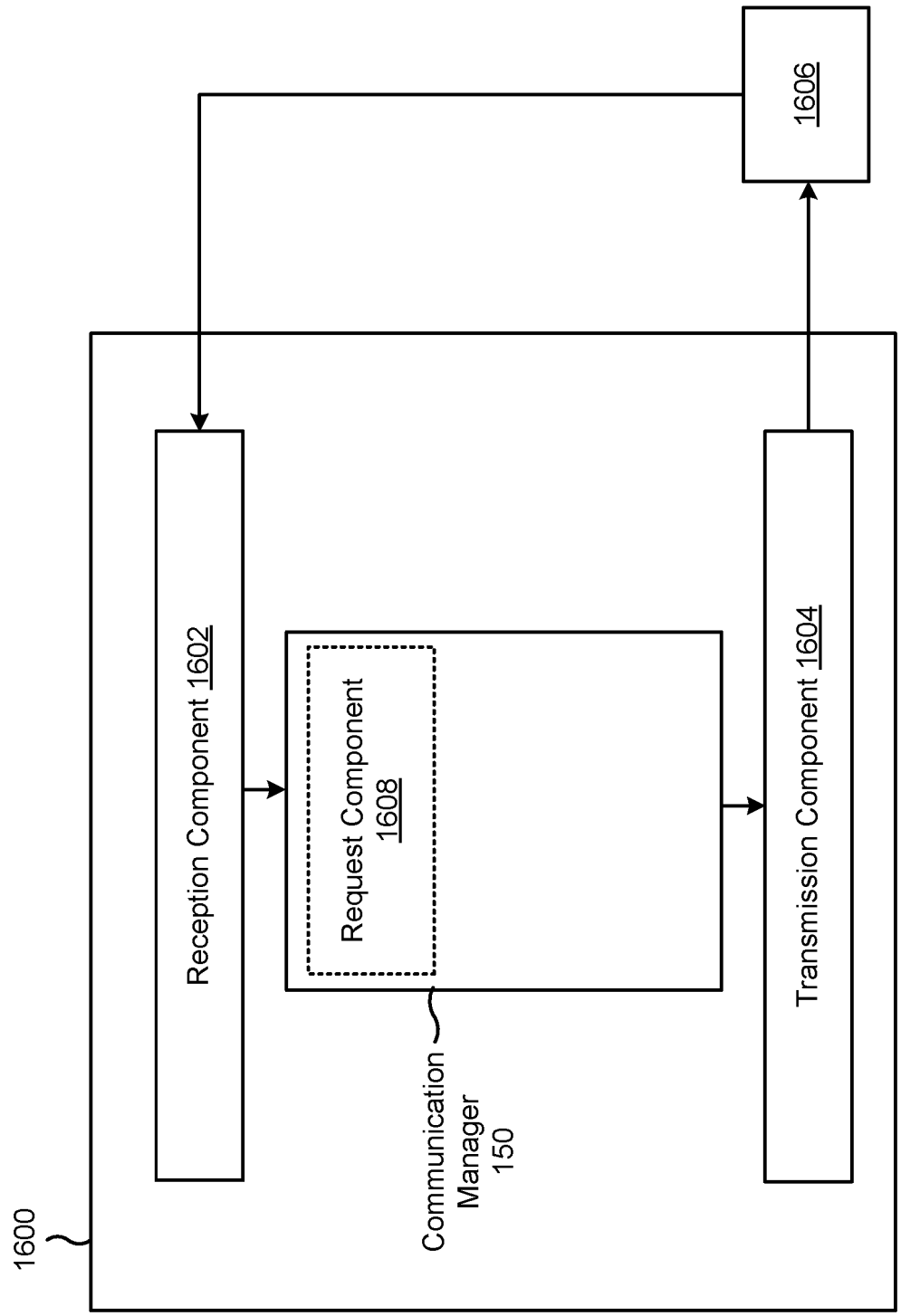

FIG. 16 is a diagram of an example apparatus 1600 for wireless communication. The apparatus 1600 may be a network entity, or a network entity may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a request component 1608, among other examples.

In some aspects, the apparatus 1600 may be configured to perform one or more operations described herein in connection with FIGS. 9 and 10. Additionally, or alternatively, the apparatus 1600 may be configured to perform one or more processes described herein, such as process 1300 of FIG. 13. In some aspects, the apparatus 1600 and/or one or more components shown in FIG. 16 may include one or more components of the base station described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a modem, a demodulator, a MIMO detector, a receive processor, a controller/processor, a memory, or a combination thereof, of the network entity described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network entity described in connection with FIG. 2. In some aspects, the transmission component 1604 may be co-located with the reception component 1602 in a transceiver.

The reception component 1602 may receive, from a relay UE, FD information associated with the relay UE, wherein the FD information indicates at least one of a capability of the relay UE relating to FD communication, a first indication of whether the relay UE can perform FD relaying based at least in part on a condition at the relay UE, or a second indication of whether the relay UE can perform FD relaying associated with one or more beams. The transmission component 1604 may transmit the FD information to a destination UE associated with the relay UE.

The request component 1608 may receive (e.g., via the reception component 1602), from at least one of the destination UE or the relay UE, a request for the FD information, wherein transmitting the FD information is based at least in part on the request.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a relay UE, comprising: transmitting FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and communicating based at least in part on the FD information.

Aspect 2: The method of Aspect 1, wherein the capability is at least one of: a capability relating to bidirectional sidelink FD communication, a capability relating to FD relaying between a destination UE and a radio access node via the relay UE, a capability relating to FD relaying between sidelink UEs, or a capability relating to bidirectional radio access FD communication.

Aspect 3: The method of one or more of Aspects 1 and 2, wherein the FD information indicating the capability is statically or semi-statically signaled.

Aspect 4: The method of one or more of Aspects 1 through 3, wherein the condition at the relay UE is based at least in part on an SI measurement by the relay UE.

Aspect 5: The method of Aspect 4, wherein the first indication indicates that the relay UE can perform FD relaying if the SI measurement, for at least one beam pair of the relay UE, indicates a self-interference level that is lower than a threshold.

Aspect 6: The method of Aspect 4, wherein the SI measurement is based at least in part on a transmission by the relay UE.

Aspect 7: The method of one or more of Aspects 1 through 6, wherein the condition at the relay UE is based at least in part on a mobility status of the relay UE.

Aspect 8: The method of one or more of Aspects 1 through 7, wherein the one or more beams comprise one or more candidate beam pairs of the relay UE.

Aspect 9: The method of one or more of Aspects 1 through 8, wherein the second indication indicates whether the one or more beams can support FD relaying at a threshold level of quality.

Aspect 10: The method of Aspect 9, wherein whether the one or more beams can support FD relaying at the threshold level of quality is based at least in part on at least one of a SI measurement by the relay UE or a mobility status of the relay UE.

Aspect 11: The method of one or more of Aspects 1 through 10, wherein the second indication is transmitted via the one or more beams.

Aspect 12: The method of one or more of Aspects 1 through 11, wherein the second indication is transmitted via a beam other than the one or more beams.

Aspect 13: The method of one or more of Aspects 1 through 12, wherein the one or more beams are for communication between the relay UE and a destination UE, and wherein the second indication indicates whether the one or more beams can be used for relay-to-destination communication, destination-to-relay communication, or relay-to-destination and destination-to-relay communication.

Aspect 14: The method of one or more of Aspects 1 through 13, wherein the FD information indicates a beam between the relay UE and a base station.

Aspect 15: The method of one or more of Aspects 1 through 14, wherein the second indication indicates an SI level at the relay UE for the one or more beams, wherein the SI level is associated with at least one of: interference from a transmit beam of the relay UE associated with a destination UE to a reception beam of the relay UE associated with a radio access node, or interference from a transmit beam of the relay UE associated with a radio access node to a reception beam of the relay UE associated with a destination UE.

Aspect 16: The method of one or more of Aspects 1 through 15, wherein the second indication indicates, for the one or more beams, at least one of: an SINR at the relay UE, an estimated MCS at the relay UE, or an estimated throughput at the relay UE.

Aspect 17: The method of Aspect 16, wherein the SINR, the MCS, or the estimated throughput is measured at one of:

a receive beam of the relay UE associated with a destination UE, or a receive beam of the relay UE associated with a radio access node.

Aspect 18: The method of one or more of Aspects 1 through 17, further comprising: receiving a request for the FD information from a destination UE, wherein transmitting the FD information is based at least in part on the request.

Aspect 19: The method of Aspect 18, further comprising: transmitting information indicating the capability of the relay UE relating to FD communication prior to receiving the request.

Aspect 20: The method of Aspect 18, wherein the request is received via a discovery request associated with sidelink UE discovery.

Aspect 21: The method of Aspect 18, wherein the request indicates which FD information, of the capability, the first indication, or the second indication, is to be provided.

Aspect 22: The method of one or more of Aspects 1 through 21, wherein the FD information is transmitted via a discovery response message.

Aspect 23: The method of one or more of Aspects 1 through 22, wherein transmitting the FD information further comprises: transmitting the FD information to a network entity.

Aspect 24: The method of Aspect 23, wherein transmitting the FD information to the network entity is initiated by the network entity or by a destination UE.

Aspect 25: The method of one or more of Aspects 1 through 24, wherein transmitting the FD information further comprises: transmitting the FD information to a destination UE.

Aspect 26: A method of wireless communication performed by a destination UE, comprising: receiving FD information associated with a relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and communicating based at least in part on the FD information.

Aspect 27: The method of Aspect 26, wherein the capability is at least one of: a capability relating to bi-directional sidelink FD communication, a capability relating to FD relaying between the destination UE and a radio access node via the relay UE, a capability relating to FD relaying between sidelink UEs, or a capability relating to bi-directional radio access FD communication.

Aspect 28: The method of one or more of Aspects 26 and 27, wherein the FD information indicating the capability is statically or semi-statically signaled.

Aspect 29: The method of one or more of Aspects 26 through 28, wherein the condition at the relay UE is based at least in part on an SI measurement by the relay UE.

Aspect 30: The method of Aspect 29, wherein the first indication indicates that the relay UE can perform FD relaying if the SI measurement, for at least one beam pair of the relay UE, indicates an SI level that is lower than a threshold.

Aspect 31: The method of one or more of Aspects 26 through 30, wherein the one or more beams comprise one or more candidate beam pairs of the relay UE.

Aspect 32: The method of one or more of Aspects 26 through 31, wherein the second indication indicates whether the one or more beams can support FD relaying at a threshold level of quality.

Aspect 33: The method of one or more of Aspects 26 through 32, wherein the second indication is received via the one or more beams.

Aspect 34: The method of one or more of Aspects 26 through 33, wherein the second indication is received via a beam other than the one or more beams.

Aspect 35: The method of one or more of Aspects 26 through 34, wherein the one or more beams are for communication between the relay UE and the destination UE, and wherein the second indication indicates whether the one or more beams can be used for relay-to-destination communication, destination-to-relay communication, or relay-to-destination and destination-to-relay communication.

Aspect 36: The method of one or more of Aspects 26 through 35, wherein the FD information indicates a beam between the relay UE and a base station.

Aspect 37: The method of one or more of Aspects 26 through 36, wherein the second indication indicates an SI level at the relay UE for the one or more beams, wherein the SI level is associated with at least one of: interference from a transmit beam of the relay UE associated with a destination UE to a reception beam of the relay UE associated with a radio access node, or interference from a transmit beam of the relay UE associated with a radio access node to a reception beam of the relay UE associated with a destination UE.

Aspect 38: The method of one or more of Aspects 26 through 37, wherein the second indication indicates, for the one or more beams, at least one of: an SINR at the relay UE, an estimated MCS at the relay UE, or an estimated throughput at the relay UE.

Aspect 39: The method of Aspect 38, wherein the SINR, the MCS, or the estimated throughput is measured at one of: a receive beam of the relay UE associated with a destination UE, or a receive beam of the relay UE associated with a radio access node.

Aspect 40: The method of one or more of Aspects 26 through 39, further comprising: transmitting a request for the FD information, wherein transmitting the FD information is based at least in part on the request.

Aspect 41: The method of Aspect 40, further comprising: receiving information indicating the capability prior to transmitting the request, wherein transmitting the request is based at least in part on the information indicating the capability.

Aspect 42: The method of Aspect 40, wherein the request is transmitted via a discovery request associated with sidelink UE discovery.

Aspect 43: The method of Aspect 40, wherein the request indicates which FD information, of the capability, the first indication, or the second indication, is to be provided.

Aspect 44: The method of one or more of Aspects 26 through 43, wherein the FD information is received via a discovery response message.

Aspect 45: The method of one or more of Aspects 26 through 43, wherein receiving the FD information further comprises: receiving the FD information from a network entity.

Aspect 46: The method of Aspect 45, wherein receiving the FD information from the network entity is initiated by the destination UE.

Aspect 47: The method of one or more of Aspects 26 through 46, wherein the relay UE is a first relay UE, and wherein the method further comprises: receiving FD information from a second relay UE; and selecting a relay UE, of the first relay UE and the second relay UE, for relaying communications based at least in part on respective first indications of whether the first relay UE and the second relay UE can perform FD relaying.

Aspect 48: The method of one or more of Aspects 26 through 47, wherein the relay UE is a first relay UE, and wherein the method further comprises: receiving FD information from a second relay UE; and selecting a relay UE, of the first relay UE and the second relay UE, for relaying communications based at least in part on respective second indications of whether the first relay UE and the second relay UE can perform FD relaying associated with a preferred candidate beam of the destination UE, wherein the preferred candidate beam is associated with a threshold quality.

Aspect 49: A method of wireless communication performed by an apparatus of a network entity, comprising: receiving, from a relay UE, FD information associated with the relay UE, wherein the FD information indicates at least one of: a capability of the relay UE relating to FD communication, a first indication of whether the relay UE can perform FD relaying based at least in part on a condition at the relay UE, or a second indication of whether the relay UE can perform FD relaying associated with one or more beams; and transmitting the FD information to a destination UE associated with the relay UE.

Aspect 50: The method of Aspect 49, wherein the network entity is associated with a server or a controller.

Aspect 51: The method of one or more of Aspects 49 and 50, further comprising: receiving, from at least one of the destination UE or the relay UE, a request for the FD information, wherein transmitting the FD information is based at least in part on the request.

Aspect 52: The method of Aspect 51, wherein the request is received prior to receiving the FD information, and wherein receiving the FD information further comprises: obtaining the FD information based at least in part on the request.

Aspect 53: An apparatus for wireless communication at a device, comprising a processor; memory coupled with the processor; and instructions stored in the memory and executable by the processor to cause the apparatus to perform the method of one or more of Aspects 1 through 25.

Aspect 54: A device for wireless communication, comprising a memory and one or more processors coupled to the memory, the one or more processors configured to perform the method of one or more of Aspects 1 through 25.

Aspect 55: An apparatus for wireless communication, comprising at least one means for performing the method of one or more of Aspects 1 through 25.

Aspect 56: A non-transitory computer-readable medium storing code for wireless communication, the code comprising instructions executable by a processor to perform the method of one or more of Aspects 1 through 25.

Aspect 57: A non-transitory computer-readable medium storing a set of instructions for wireless communication, the set of instructions comprising one or more instructions that, when executed by one or more processors of a device, cause the device to perform the method of one or more of Aspects 1 through 25.

Aspect 58: An apparatus for wireless communication at a device, comprising a processor; memory coupled with the processor; and instructions stored in the memory and executable by the processor to cause the apparatus to perform the method of one or more of Aspects 26 through 48.

Aspect 59: A device for wireless communication, comprising a memory and one or more processors coupled to the memory, the one or more processors configured to perform the method of one or more of Aspects 26 through 48.

Aspect 60: An apparatus for wireless communication, comprising at least one means for performing the method of one or more of Aspects 26 through 48.

Aspect 61: A non-transitory computer-readable medium storing code for wireless communication, the code comprising instructions executable by a processor to perform the method of one or more of Aspects 26 through 48.

Aspect 62: A non-transitory computer-readable medium storing a set of instructions for wireless communication, the set of instructions comprising one or more instructions that, when executed by one or more processors of a device, cause the device to perform the method of one or more of Aspects 26 through 48.

Aspect 63: An apparatus for wireless communication at a device, comprising a processor; memory coupled with the processor; and instructions stored in the memory and executable by the processor to cause the apparatus to perform the method of one or more of Aspects 49 through 52.

Aspect 64: A device for wireless communication, comprising a memory and one or more processors coupled to the memory, the one or more processors configured to perform the method of one or more of Aspects 49 through 52.

Aspect 65: An apparatus for wireless communication, comprising at least one means for performing the method of one or more of Aspects 49 through 52.

Aspect 66: A non-transitory computer-readable medium storing code for wireless communication, the code comprising instructions executable by a processor to perform the method of one or more of Aspects 49 through 52.

Aspect 67: A non-transitory computer-readable medium storing a set of instructions for wireless communication, the set of instructions comprising one or more instructions that, when executed by one or more processors of a device, cause the device to perform the method of one or more of Aspects 49 through 52.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a relay user equipment (UE) for wireless communication, comprising:
   one or more memories; and
   one or more processors, coupled to the one or more memories, configured to:
   receive, from a destination UE, a request for full-duplex (FD) information associated with the relay UE;
   transmit the FD information associated with the relay UE based at least in part on receiving the request, wherein the FD information indicates at least one of:
   a capability of the relay UE relating to FD communication,
   a first indication of whether the relay UE can perform FD relaying based at least in part on a condition at the relay UE, or
   a second indication of whether the relay UE can perform FD relaying associated with one or more beams based at least in part on the condition at the relay UE; and
   communicate based at least in part on the FD information,
   wherein the condition at the relay UE is based at least in part on a self-interference measurement by the relay UE.

2. The apparatus of claim 1, wherein the capability is at least one of:
   a capability relating to bidirectional sidelink FD communication,
   a capability relating to FD relaying between the destination UE and a radio access node via the relay UE,
   a capability relating to FD relaying between sidelink UEs, or
   a capability relating to bidirectional radio access FD communication.

3. The apparatus of claim 1, wherein the FD information indicating the capability is statically or semi-statically signaled.

4. The apparatus of claim 1, wherein the condition at the relay UE is further based at least in part on a mobility status of the relay UE.

5. The apparatus of claim 1, wherein the one or more beams comprise one or more candidate beam pairs of the relay UE.

6. The apparatus of claim 1, wherein the second indication indicates whether the one or more beams can support FD relaying at a threshold level of quality.

7. The apparatus of claim 1, wherein the second indication is transmitted via the one or more beams.

8. The apparatus of claim 1, wherein the second indication is transmitted via a beam other than the one or more beams.

9. The apparatus of claim 1, wherein the one or more beams are for communication between the relay UE and the destination UE, and wherein the second indication indicates whether the one or more beams can be used for relay-to-destination communication, destination-to-relay communication, or relay-to-destination and destination-to-relay communication.

10. The apparatus of claim 1, wherein the FD information indicates a beam between the relay UE and a base station.

11. The apparatus of claim 1, wherein the second indication indicates a self-interference level at the relay UE for the one or more beams, wherein the self-interference level is associated with at least one of:
   interference from a transmit beam of the relay UE associated with the destination UE to a reception beam of the relay UE associated with a radio access node, or
   interference from a transmit beam of the relay UE associated with the radio access node to a reception beam of the relay UE associated with the destination UE.

12. The apparatus of claim 1, wherein the second indication indicates, for the one or more beams, at least one of:
   a signal-to-interference-plus-noise ratio (SINR) at the relay UE,
   an estimated modulation and coding scheme (MCS) at the relay UE, or
   an estimated throughput at the relay UE.

13. The apparatus of claim 1, wherein the FD information is transmitted via a discovery response message.

14. The apparatus of claim 1, wherein the one or more processors, to transmit the FD information, are configured to:
   transmit the FD information to a network entity.

15. The apparatus of claim 1, wherein the one or more processors, to transmit the FD information, are configured to:
   transmit the FD information to the destination UE.

16. An apparatus of a destination user equipment (UE) for wireless communication, comprising:
   one or more memories; and
   one or more processors, coupled to the one or more memories, configured to:
   transmit, to a relay UE, a request for full-duplex (FD) information associated with the relay UE;

receive the FD information associated with the relay UE based at least in part on transmitting the request, wherein the FD information indicates at least one of:
- a capability of the relay UE relating to FD communication,
- a first indication of whether the relay UE can perform FD relaying based at least in part on a condition at the relay UE, or
- a second indication of whether the relay UE can perform FD relaying associated with one or more beams based at least in part on the condition at the relay UE; and communicate based at least in part on the FD information,
wherein the condition at the relay UE is based at least in part on a self-interference measurement by the relay UE.

17. The apparatus of claim 16, wherein the one or more beams comprise one or more candidate beam pairs of the relay UE.

18. The apparatus of claim 16, wherein the second indication is received via the one or more beams.

19. The apparatus of claim 16, wherein the second indication is received via a beam other than the one or more beams.

20. The apparatus of claim 16, wherein the FD information indicates a beam between the relay UE and a base station.

21. The apparatus of claim 16, wherein the one or more processors are further configured to:
receive information indicating the capability prior to transmitting the request, wherein transmitting the request is based at least in part on the information indicating the capability.

22. The apparatus of claim 16, wherein the relay UE is a first relay UE, and wherein the one or more processors are further configured to:
receive FD information from a second relay UE; and
select a relay UE, of the first relay UE and the second relay UE, for relaying communications based at least in part on respective first indications of whether the first relay UE and the second relay UE can perform FD relaying.

23. An apparatus of a network entity for wireless communication, comprising:

one or more memories; and
one or more processors, coupled to the one or more memories, configured to:
receive, from a relay user equipment (UE), full-duplex (FD) information associated with the relay UE, wherein the FD information indicates at least one of:
- a capability of the relay UE relating to FD communication,
- a first indication of whether the relay UE can perform FD relaying based at least in part on a condition at the relay UE, or
- a second indication of whether the relay UE can perform FD relaying associated with one or more beams based at least in part on the condition at the relay UE;

receive, from at least one of a destination UE or the relay UE, a request for the FD information; and
transmit the FD information to the destination UE associated with the relay UE based at least in part on receiving the request,
wherein the condition at the relay UE is based at least in part on a self-interference measurement of the relay UE.

24. The apparatus of claim 23, wherein the network entity is associated with a server or a controller.

25. The apparatus of claim 23, wherein the request is received prior to receiving the FD information, and wherein receiving the FD information further comprises:
obtain the FD information based at least in part on the request.

26. The apparatus of claim 1, wherein the request for the FD information is received via a discovery request.

27. The apparatus of claim 1, wherein the request for the FD information further comprises an indication that the FD information includes at least one of:
- the capability of the relay UE relating to FD communication,
- the first indication of whether the relay UE can perform FD relaying based at least in part on the condition at the relay UE, or
- the second indication of whether the relay UE can perform FD relaying associated with the one or more beams based at least in part on the condition at the relay UE.

* * * * *